United States Patent
Madan et al.

(10) Patent No.: US 9,648,569 B2
(45) Date of Patent: May 9, 2017

(54) SYSTEM AND METHOD TO FACILITATE SMALL CELL UPLINK POWER CONTROL IN A NETWORK ENVIRONMENT

(71) Applicant: CISCO TECHNOLOGY, INC., San Jose, CA (US)

(72) Inventors: Ritesh K. Madan, Berkeley, CA (US); Rohit Umesh Nabar, Sunnyvale, CA (US); Vikram Chandrasekhar, Mountain View, CA (US); Kedar Durgadas Shirali, Sunnyvale, CA (US); Qing Zhao, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/809,201

(22) Filed: Jul. 25, 2015

(65) Prior Publication Data
US 2017/0026914 A1  Jan. 26, 2017

(51) Int. Cl.
*H04B 7/00* (2006.01)
*H04W 52/24* (2009.01)
*H04W 52/14* (2009.01)

(52) U.S. Cl.
CPC ....... *H04W 52/244* (2013.01); *H04W 52/146* (2013.01); *H04W 52/241* (2013.01); *H04W 52/242* (2013.01)

(58) Field of Classification Search
CPC .................................................. H04W 52/244
(Continued)

(56) References Cited

U.S. PATENT DOCUMENTS 6,141,565 A  10/2000  Feuerstein et al.
6,600,924 B1  7/2003  Sinivaara
(Continued)

FOREIGN PATENT DOCUMENTS

CN   102 271 414   12/2011
CN   104684052 A   6/2015
(Continued)

OTHER PUBLICATIONS

"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
(Continued)

*Primary Examiner* — Sanh Phu
(74) *Attorney, Agent, or Firm* — Patent Capital Group

(57) ABSTRACT

A method is provided in one example embodiment and may include calculating, by one or more of a plurality of small cell radios, one or more sets of candidate power control parameters using a first interference constraint for uplink user equipment (UE) transmissions for UE served by the one or more of the plurality of small cell radios; determining, at a central management entity, whether an average of a sum of an expected interference for UE associated with the plurality of small cell radios violates a second interference constraint for any of the one or more sets of candidate power control parameters; and generating one or more messages for each of the plurality of small cell radios identifying one or more particular sets of power control parameters that provide for meeting the second interference constraint.

20 Claims, 8 Drawing Sheets

(58) Field of Classification Search
USPC ......................................................... 455/501
See application file for complete search history.

(56) References Cited

U.S. PATENT DOCUMENTS

| | | |
|---|---|---|
| 6,771,934 B2 | 8/2004 | Demers |
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,107,950 B2 | 1/2012 | Amerijoo et al. |
| 8,126,495 B2 | 2/2012 | Wu |
| 8,145,223 B2 | 3/2012 | Guey |
| 8,145,252 B2 | 3/2012 | Sung et al. |
| 8,170,544 B1 | 5/2012 | Satapathy et al. |
| 8,194,630 B2 | 6/2012 | Qvarfordt |
| 8,208,937 B2 | 6/2012 | Zhang |
| 8,229,451 B2 | 7/2012 | Frenger et al. |
| 8,270,976 B2 | 9/2012 | Simonsson et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,731,567 B2 | 5/2014 | Zhang |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,805,373 B2 | 8/2014 | Chayat |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,879,441 B2 | 11/2014 | Hunukumbure |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,197,358 B2 | 11/2015 | Hejazi |
| 9,219,816 B2 | 12/2015 | Grayson |
| 9,313,004 B2 | 4/2016 | Yanover et al. |
| 9,332,458 B2 | 5/2016 | Nuss et al. |
| 9,344,970 B2 | 5/2016 | Uplenchwar et al. |
| 9,414,310 B2 | 8/2016 | Grayson |
| 9,490,953 B2 | 11/2016 | Yanover et al. |
| 9,497,708 B2 | 11/2016 | Uplenchwar et al. |
| 9,544,857 B2 | 1/2017 | Carter et al. |
| 9,559,798 B2 | 1/2017 | Nuss et al. |
| 2002/0019245 A1 | 2/2002 | Longoni |
| 2002/0061742 A1 | 5/2002 | Lapaille |
| 2004/0085909 A1 | 5/2004 | Soliman |
| 2004/0132486 A1 | 7/2004 | Halonen |
| 2004/0213170 A1 | 10/2004 | Bremer |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2006/0292989 A1 | 12/2006 | Gerlach |
| 2007/0008885 A1 | 1/2007 | Bonner |
| 2007/0082620 A1 | 4/2007 | Zhang et al. |
| 2007/0177501 A1 | 8/2007 | Papasakellariou |
| 2007/0253372 A1 | 11/2007 | Nakayasu |
| 2007/0280170 A1 | 12/2007 | Kawasaki |
| 2008/0004028 A1 | 1/2008 | Vincent |
| 2008/0043623 A1 | 2/2008 | Franceschini |
| 2008/0084844 A1 | 4/2008 | Reznik |
| 2008/0107074 A1 | 5/2008 | Salmenkaita et al. |
| 2008/0139197 A1 | 6/2008 | Misra et al. |
| 2008/0188234 A1 | 8/2008 | Gorokhov |
| 2008/0188265 A1 | 8/2008 | Carter et al. |
| 2008/0268833 A1 | 10/2008 | Huang |
| 2009/0005030 A1 | 1/2009 | Han |
| 2009/0054047 A1 | 2/2009 | Kylvaja |
| 2009/0067370 A1 | 3/2009 | Kim |
| 2009/0081955 A1 | 3/2009 | Necker |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0105406 A1 | 4/2010 | Luo |
| 2010/0110989 A1 | 5/2010 | Wu |
| 2010/0112982 A1 | 5/2010 | Singh et al. |
| 2010/0124930 A1* | 5/2010 | Andrews ............... H04W 16/10 455/436 |
| 2010/0177722 A1 | 7/2010 | Guvenc |
| 2010/0227611 A1 | 9/2010 | Schmidt et al. |
| 2010/0233962 A1 | 9/2010 | Johansson |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267338 A1 | 10/2010 | Chiu |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0285795 A1* | 11/2010 | Whinnett ............ H04W 52/146 455/424 |
| 2010/0309864 A1 | 12/2010 | Tamaki |
| 2010/0311449 A1 | 12/2010 | Whinnett |
| 2010/0317351 A1 | 12/2010 | Gerstenberger |
| 2011/0034174 A1 | 2/2011 | Xu |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0092209 A1 | 4/2011 | Gaal |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0151881 A1 | 6/2011 | Chou |
| 2011/0176497 A1 | 7/2011 | Gopalakrishnan |
| 2011/0182375 A1 | 7/2011 | Kim et al. |
| 2011/0194423 A1 | 8/2011 | Cho |
| 2011/0195730 A1 | 8/2011 | Chami |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2011/0306347 A1 | 12/2011 | Choi |
| 2011/0310879 A1 | 12/2011 | Wu |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046028 A1* | 2/2012 | Damnjanovic ........ H04W 24/02 455/423 |
| 2012/0046063 A1 | 2/2012 | Chande |
| 2012/0083201 A1 | 4/2012 | Truong |

(56) References Cited

U.S. PATENT DOCUMENTS

| | | |
|---|---|---|
| 2012/0087247 A1 | 4/2012 | Min et al. |
| 2012/0087266 A1 | 4/2012 | Vajapeyam |
| 2012/0100849 A1 | 4/2012 | Marsico |
| 2012/0129537 A1 | 5/2012 | Liu et al. |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0258720 A1 | 10/2012 | Tinnakornsurisphap et al. |
| 2012/0265888 A1 | 10/2012 | Roeland et al. |
| 2012/0270536 A1* | 10/2012 | Ratasuk .............. H04W 52/146 455/423 |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0029669 A1 | 1/2013 | Boudreau |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0109380 A1 | 5/2013 | Centonza |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1 | 10/2013 | Takaoka |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0126537 A1* | 5/2014 | Chen .............. H04W 36/0016 370/331 |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1* | 6/2014 | Liu ................ H04W 52/146 455/522 |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1* | 8/2014 | Chaudhuri .......... H04W 52/243 370/329 |
| 2014/0220990 A1 | 8/2014 | Lorca Hernando |
| 2014/0226736 A1 | 8/2014 | Niu et al. |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1* | 9/2014 | Singh .................. H04W 52/241 455/522 |
| 2014/0293906 A1 | 10/2014 | Chang et al. |
| 2014/0302859 A1 | 10/2014 | Nama |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1 | 3/2015 | Shen |
| 2015/0063231 A1 | 3/2015 | Seo et al. |
| 2015/0087325 A1 | 3/2015 | Nuss et al. |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0237588 A1* | 8/2015 | Zhao .................... H04W 24/08 455/127.2 |
| 2015/0256314 A1 | 9/2015 | Gauvreau et al. |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0365855 A1 | 12/2015 | Nuss et al. |
| 2015/0373698 A1 | 12/2015 | Uplenchwar et al. |
| 2015/0382367 A1 | 12/2015 | Yanover et al. |
| 2016/0127069 A1 | 5/2016 | Nuss et al. |
| 2016/0150442 A1 | 5/2016 | Kwan |
| 2016/0157126 A1 | 6/2016 | Nuss et al. |
| 2016/0165485 A1 | 6/2016 | Kwan |
| 2016/0198412 A1 | 7/2016 | Uplenchwar et al. |
| 2016/0219596 A1 | 7/2016 | Yanover et al. |
| 2016/0242122 A1 | 8/2016 | Yue |
| 2016/0309356 A1 | 10/2016 | Madan et al. |
| 2016/0309476 A1 | 10/2016 | Madan et al. |
| 2016/0373202 A1 | 12/2016 | Nuss et al. |

FOREIGN PATENT DOCUMENTS

| | | |
|---|---|---|
| EP | 1322048 | 6/2003 |
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2566261 | 3/2013 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |

(56) References Cited

FOREIGN PATENT DOCUMENTS

| | | |
|---|---|---|
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/071308 | 5/2014 |
| WO | WO2014/087392 | 6/2014 |
| WO | WO2014/087393 | 6/2014 |

OTHER PUBLICATIONS

"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.

"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.

"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.

"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.

"Received signal strength indication," Wikipedia, the free encyclopedia, Dec. 22, 2014; 2 pages.

Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.

Ghaffar, Rizwan, et al., "Fractional Frequency Reuse and Interference Suppression for OFDMA Networks," published in "WiOpt" 10: Modeling and Optimization in Mobile, Ad Hoc, and Wireless Networks (2010), Jul. 19, 2010, 5 pages.

La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.

Madan, Ritesh, et al., "Fast Algorithms for Resource Allocation in Wireless Cellular Networks," IEEE/ACM Transactions on Networking, vol. 18, No. 3, Jun. 2010; 12 pages.

Park, Jeongho, et al., "Interference Level Control in Mobile WiMAX Uplink System," 2009 IEEE Mobile WiMAX Symposium, Jul. 9-10, 2009; 5 pages.

Rengarajan, Balaji, "A Semi-autonomous Algorithm for Self-organizing Dynamic Fractional Frequency Reuse on the Uplink of OFDMA Systems," Dec. 14, 2009; 22 pages.

Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.

Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.

Thapa, Chandra, et al., "Comparative Evaluation of Fractional Frequency Reuse (FFR) and Traditional Frequency Reuse in 3GPP-LTE Downlink," International Journal of Mobile Network Communications & Telematics (IJMNCT) vol. 2, No. 4, Aug. 2012; 8 pages.

Wang, Jiao, "Dynamic Centralized Interference Coordination in Femto Cell Network with QoS Provision," Latest Trends on Communications, Proceedings of the 18$^{th}$ International Conference on Communications (Part of CSCC '14), Jul. 17-21, 2014; 6 pages.

Xiong, Chao, "Enhanced ICIC for LTE-A HetNet," ZTE Corporation, LTE World Summit 2012, May 2012; 3 pages.

Zyren, Jim, "Overview of the 3GPP Long Term Evolution Physical Layer," White Paper, Freescale Semiconductor, Document No. 3GPPEVOLUTIONWP; Jul. 2007; 27 pages.

U.S. Appl. No. 14/833,519, filed Aug. 24, 2015, entitled "System and Method to Facilitate Small Cell Uplink Power Control in a Network Environment," Inventors: Ritesh K. Madan, et al.

U.S. Appl. No. 14/845,995, filed Sep. 4, 2015, entitled "Method and System for Dynamic Allocation of Resources in a Cellular Network," Inventors: Vladimir Yanover, et al.

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommu-

(56) References Cited

OTHER PUBLICATIONS nications Standards Institute 2012, 650 Route des Lucioles, F-06921 Sophia Antipolis Cedex—France, Jan. 2015; 368 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 125 469 v11.2.0, Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS

(56) References Cited

OTHER PUBLICATIONS 36.321 version 12.7.0 Release 12);" ETSI, European Telecommunications Standards Institute, 650 Route des Lucioles F-06921 Sophia Antipolis Cedex—France, Oct. 2015; 79 pages.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.

"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.

"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.

"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.

"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.

"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.

"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.

"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.

"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.

"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.

"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.

"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.

"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.

"3GPP LTE Packet Data Convergence Protocol (PDCP) Sub Layer," EventHelix.com Inc., first published on or about Jan. 1, 2010; 20 pages.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.

"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.

"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.

"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 23.887 V12.0.0 (Dec. 2013) Technical Report: 3rd Generation Partnership Project; Technical Specification Group Services and System Aspects; Study on Machine-Type Communica-

(56) References Cited

OTHER PUBLICATIONS tions (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Releasel2)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.
"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.

(56) References Cited

OTHER PUBLICATIONS

"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Cisco's One Platform Kit (onePK)," Networking Software (IOS & NX-OS), Cisco Systems, Inc., First published on or about Mar. 3, 2014; 2 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Technote, first published on or about Jul. 9, 2012; 13 pages http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Goldsmith, A.J., et al., "Variable Rate Variable-Power MQAM for Fading Channels," IEEE Trans. On Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of OULU, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. Of IEEE VTC-fail, Sep. 6-9, 2010.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Mehlfuhrer, M., et al., "Simulating the Long Term Evolution Physical Layer," Proc. Of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.

(56) References Cited

OTHER PUBLICATIONS

Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. Of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"RADIUS," Wikipedia, the free encyclopedia, 12 pages [Retrieved and printed Oct. 11, 2013] http://en.wikipedia.org/wiki/RADIUS.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. Of IEEE GLOBECOM, Dec. 2004, Dallas (USA).
Stefan Schwarz etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
EPO Jul. 29, 2014 Extended Search Report from European Application Serial No. EP13195673, 12 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Mar. 17, 2014 International Search Report and Written Opinion from International Application Serial No. PCT/IL2013/000086, 12 pages.
PCT Jun. 16, 2014 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Febuary 8, 2016, entitled "Mitigation of Uplink Interference Within Heterogeneous Wireless Communications Networks," Inventor: Pankaj Uplenchwar, et al.
U.S. Appl. No. 15/335,931, filed Oct. 27, 2016, entitled "Power Setting," Inventor: Pankaj Uplenchwar, et al.
PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].

(56) References Cited

OTHER PUBLICATIONS

Nokia Siemens Networks et al: "Enhanced ICIC considerations for HetNet scenarios", 3GPP Draft; R1-103822_EICIC_OVERVIEW, 3rd Generation Partnership Project (3GPP), Mobile Competence Centre; 650, Route Des Lucioles; F-06921 Sophia-Antipolis Cedex; France, vol. RAN WG1, No. Dresden, Germany; 20100628-20100702, Jun. 22, 2010 (Jun. 22, 2010), XP050598481, [retrieved on Jun. 22, 2010] Section 3, 4 pages.

Qualcomm Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. RAN WG2, No. Jacksonville, USA; 20101115, Nov. 9, 2010 (Nov. 9, 2010), XP050492195, [retrieved on Nov. 9, 2010] Section 16.X.2, 5 pages.

"3GPP TS 36.300 V9.7.0 (Mar. 2011) Technical Specification: $3^{rd}$ Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.

U.S. Appl. No. 15/089,252, filed Apr. 1, 2016, entitled "Method and System for Dynamic Allocation of Resources in a Cellular Network."

U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.

U.S. Appl. No. 15/251,471, filed Aug. 30, 2016, entitled "Method and Apparatus for Reducing Inter-Cell Interference," Inventor: Ziv Nuss, et al.

EPO Nov. 21, 2016 Extended Search Report and Written Opinion from European Application Serial No. 16180195.6; 9 pages.

Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.

U.S. Appl. No. 15/374,903, filed Dec. 9, 2016, entitled "Power Management in a Cellular System," Inventors: Alan James Auchmuty Carter, et al.

U.S. Appl. No. 14/479,343, filed Sep. 7, 2014, entitled "Operation of Base Station in a Celllular Communication Network," Inventor: Simon Burley.

U.S. Appl. No. 14/818,084, filed Aug. 4, 2015 entitled "Resource Adaptation for Frequency Domain Downlink Inter-Cell Interference Coordination," Inventors: Ritesh K. Madan et al.

U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.

U.S. Appl. No. 14/811,580, filed Jul. 28, 2015 entitled "Determining Fractional Frequency Reuse Power Levels for Downlink Transmissions," Inventor: Ritesh K. Madan.

U.S. Appl. No. 14/816,957, filed Aug. 3, 2015 entitled "Selecting Cells for Downlink Inter-Cell Interference Coordination," Inventors: Rohit U. Nabar et al.

U.S. Appl. no. 14/816,990, filed Aug. 3, 2015 entitled "User Equipment Power Level Selection for Downlink Transmissions," Inventors: Vikram Chandrasekhar et al.

U.S. Appl. No. 14/679,868, filed Apr. 6, 2015, entitled "System and Method for Managing Interference in a Network Environment Based on User Presence," Inventors: Mark Grayson, et al.

U.S. Appl. No. 14/687,198, filed Apr. 15, 2015, entitled "System and Method for Managing Interference in a Network Environment Based on User Presence," Inventors: Mark Grayson, et al.

U.S. Appl. No. 14/686,598, filed Apr. 14, 2015, entitled "System and Method for Providing Uplink Inter Cell Interference Coordination in a Network Environment," Inventors: Ritesh K. Madan, et al.

U.S. Appl. No. 14/691,260, filed Apr. 20, 2015, entitled "System and Method for Providing Uplink Inter Cell Interference Coordination in a Network Environment," Inventors: Ritesh K. Madan, et al.

U.S. Appl. No. 14/833,519, filed Aug. 24, 2015, entitled "System and Method to Facilitate Small Cell Uplink Powercontrol in a Network Environment," Inventors: Ritesh K. Madan, et al.

U.S. Appl. No. 14/918,420, filed Oct. 20, 2015, entitled "System and Method for Frequency and Time Domain Downlink Inter-Cell Interference Coordination," Inventors: Ritesh K. Madan, et al.

U.S. Appl. No. 14/951,987, filed Nov. 25, 2015, entitled "System and Method for Frequency and Time Domain Downlink Inter-Cell Interference Coordination," Inventors: Ritesh K. Madan, et al.

U.S. Appl. No. 14/803,475, filed Jul. 20, 2015, entitled "System and Method for Decoupling Long Term Evolution Media Access Control Scheduling From Subframe Rate Procedures," Inventors: Oliver James Bull et al.

U.S. Appl. No. 14/852,210, filed Sep. 11, 2015, entitled "System and Method for Providing Dynamic Radio Access Network Orchestration," Inventors: Virginia Rosa de Sousa Teixeira, et al.

U.S. Appl. No. 14/961,552, filed Dec. 7, 2015, entitled "System and Method to Provide Uplink Interference Coordination in a Network Environment," Inventor: Ritesh K. Madan.

U.S. Appl. No. 14/993,859, filed Jan. 12, 2016, entitled "System and Method to Facilitate Centralized Radio Resource Management in a Split Radio Access Network Environment," Inventor: Ritesh K. Madan.

U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.

\* cited by examiner

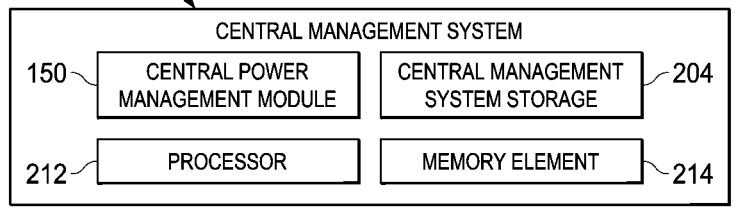
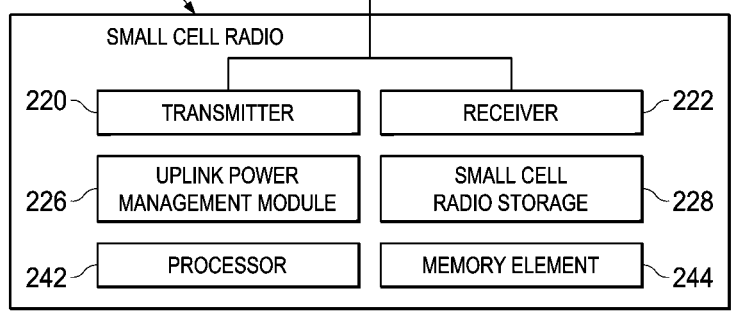
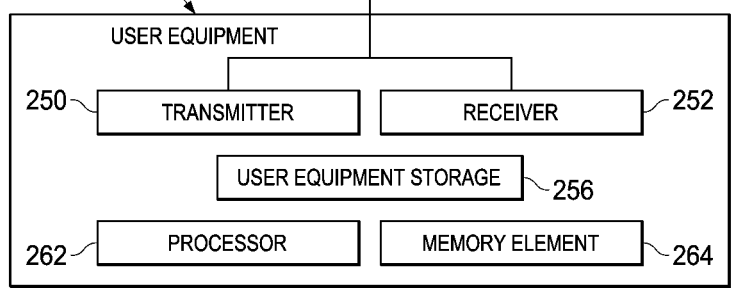

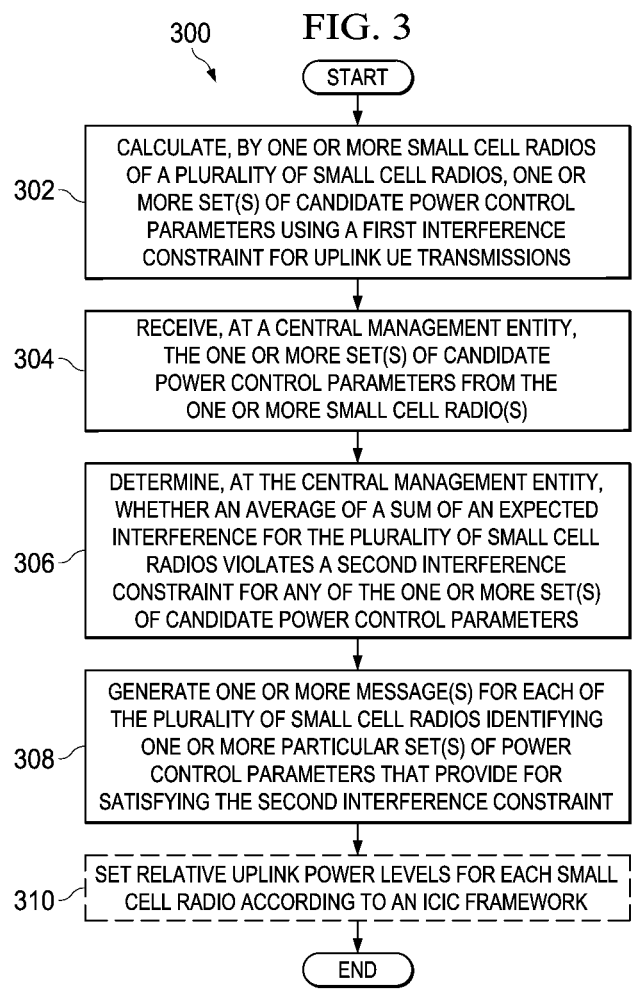

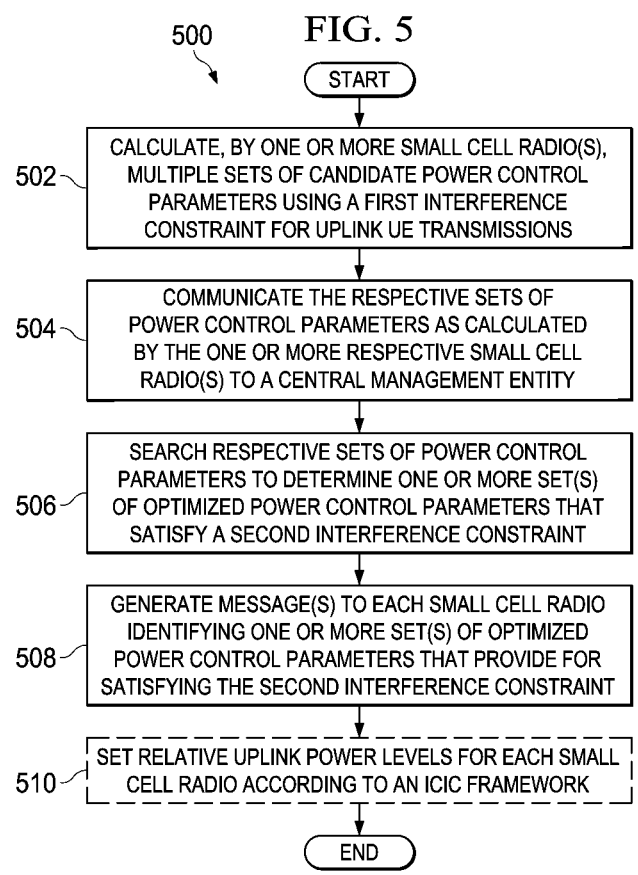

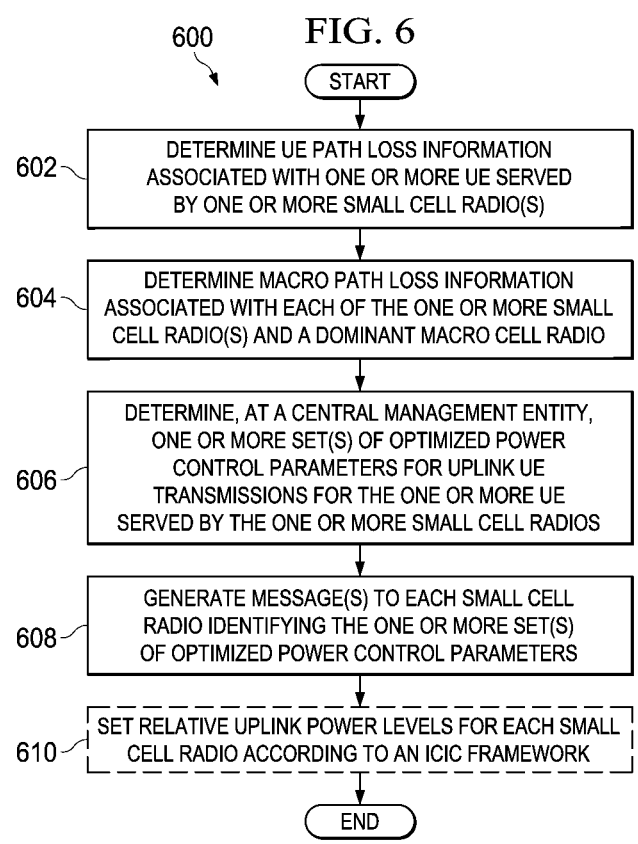

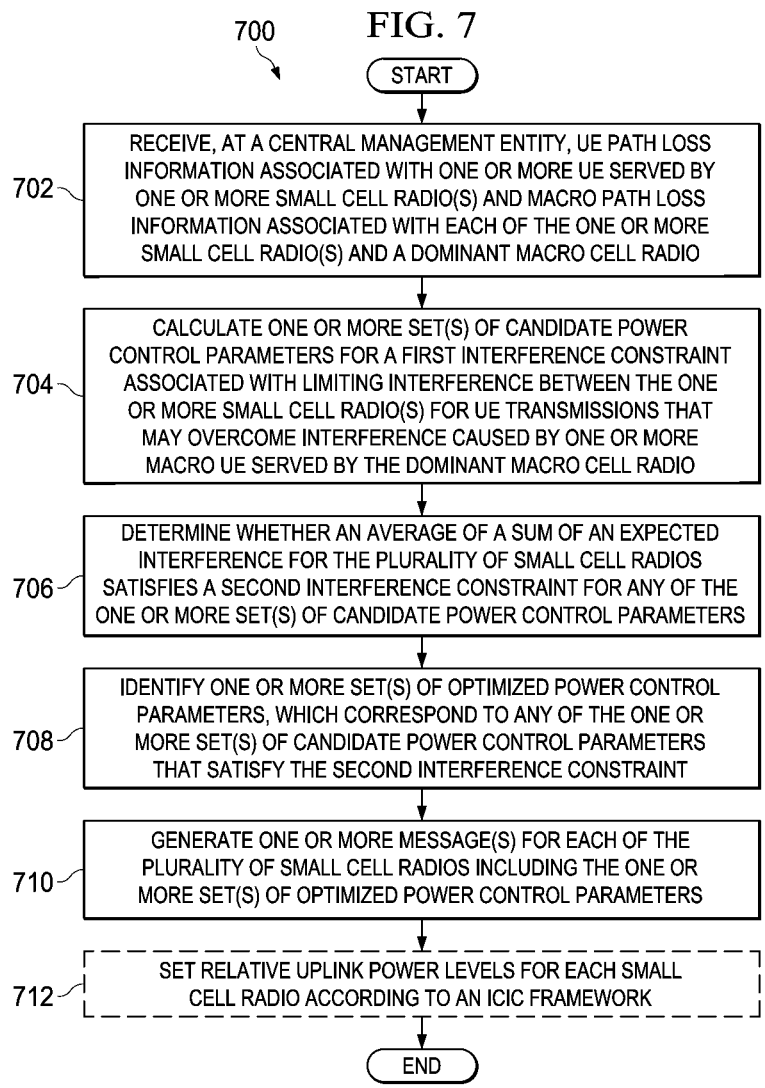

SYSTEM AND METHOD TO FACILITATE SMALL CELL UPLINK POWER CONTROL IN A NETWORK ENVIRONMENT

TECHNICAL FIELD

This disclosure relates in general to the field of communications and, more particularly, to a system and method to facilitate small cell uplink power control in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. Uplink transmissions are typically scheduled for user equipment (UE) served by a particular cell radio. Generally, power control for the uplink transmissions varies depending on path loss between UE and a serving cell radio. In some cases, uplink transmissions cause interference to other neighboring cell radios. In the case of small cell networks, uplink transmissions towards a serving small cell radio can cause interference to neighboring small cell radios as well as neighboring macro cell radios. As the number of user equipment (e.g., the number of subscribers) increases, the possibility of uplink interference between neighboring cell radios also increases, which can lead to inefficient network and UE performance. Accordingly, there are significant challenges in providing small cell uplink power control in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2C are simplified block diagrams illustrating additional details associated with various potential embodiments of the communication system;

FIG. 3 is a simplified flow diagram illustrating example operations associated with providing small cell uplink power control in a network environment in accordance with one potential embodiment of the communication system;

FIG. 5 is a simplified flow diagram illustrating yet other example operations associated with providing small cell uplink power control in a network environment in accordance with one potential embodiment of the communication system;

FIG. 6 is a simplified flow diagram illustrating yet other example operations associated with providing small cell uplink power control in a network environment in accordance with one potential embodiment of the communication system; and FIG. 7 is a simplified flow diagram illustrating yet other example operations associated with providing small cell uplink power control in a network environment in accordance with one potential embodiment of the communication system.

DETAILED DESCRIPTION OF EXAMPLE EMBODIMENTS

Overview

Figure 1A:
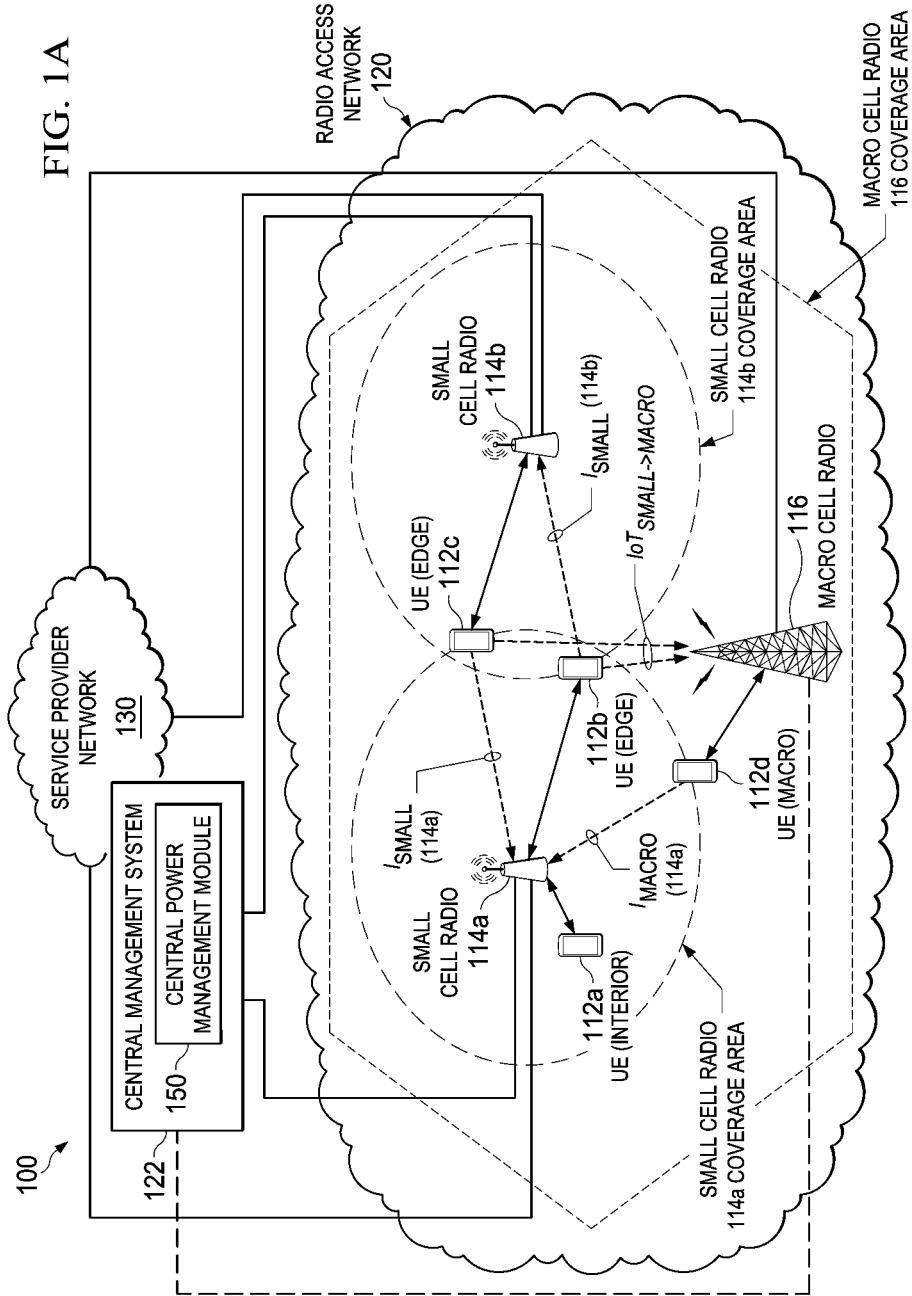
FIG. 1A is a simplified block diagram illustrating a communication system to facilitate small cell uplink power control in a network environment according to one embodiment of the present disclosure.

A method is provided in one example embodiment and may include calculating, by one or more of a plurality of small cell radios, one or more sets of candidate power control parameters using a first interference constraint for uplink user equipment (UE) transmissions for UE served by the one or more of the plurality of small cell radios; receiving, at a central management entity, the one or more sets of candidate power control parameters from each of the one or more of the plurality of small cell radios; determining, at the central management entity, whether an average of a sum of an expected interference for UE associated with the plurality of small cell radios violates a second interference constraint for any of the one or more sets of candidate power control parameters; and generating one or more messages for each of the plurality of small cell radios identifying one or more particular sets of power control parameters that provide for meeting the second interference constraint. In some instances the central management entity may be a Self-Organizing Network (SON) management system in communication with each of the plurality of small cell radios.

In some instances, each set of power control parameters can include a first power control parameter associated with a power offset for UE transmissions toward a particular small cell radio; and a second power control parameter associated with an amount of path loss between UE and the particular small cell radio that is inverted for UE transmissions toward the particular small cell radio. In some instances, the first interference constraint may be associated, at least in part, with interference generated towards each of the one or more of the plurality of small cell radios by one or more UE associated with at least one macro cell radio. In some instances, the second interference constraint may be associated, at least in part, with interference generated by the UE associated with the plurality of small cell radios towards at least one macro cell radio.

In some cases, for a particular small cell radio, calculating a particular set of candidate power control parameters can further include setting a first expected Signal to Interference plus Noise Ratio (SINR) threshold value associated with cell edge UE served by the particular small cell radio for the first interference constraint; setting a second expected SINR threshold value associated with cell interior UE served by the particular small cell radio for the first interference constraint; calculating the particular set of candidate power control parameters for the particular small cell radio using the first expected SINR threshold value and the second expected SINR threshold value for the first interference constraint; and generating a message toward the central management entity including the set of power control parameters. In some instances, for the particular small cell radio, the method can include reducing at least one of the second expected SINR threshold value associated with cell interior UE or the first expected SINR threshold value associated with cell edge UE if the central management entity determines that the second interference constraint is violated; and repeating the calculating and the generating for the particular small cell radio until the central management entity determines that the second interference constraint is satisfied.

In other cases, for a particular small cell radio, calculating sets of candidate power control parameters can further include setting a first range of first expected Signal to Interference plus Noise Ratio (SINR) threshold values associated with cell edge UE served by the particular small cell radio for the first interference constraint; setting a second range of second expected SINR threshold values associated with cell interior UE served by the particular small cell radio for the first interference constraint; calculating sets of candidate power control parameters for the particular small cell radio using each of the first expected SINR threshold value of the first range and each of the second expected SINR threshold value of the second range for the first interference constraint; and generating one or more messages toward the central management entity including the sets of power control parameters.

Another method is provided in another example embodiment and may include determining UE path loss information associated with one or more UE served by one or more small cell radios; determining macro path loss information associated with each of the one or more small cell radios and a macro cell radio; determining, at a central management entity, one or more sets of optimized power control parameters for uplink UE transmissions for the one or more UE served by the one or more small cell radios, wherein the one or more sets of optimized power control parameters satisfy a first interference constraint associated with limiting interference between the one or more small cell radios and satisfy a second interference constraint associated with limiting interference toward the macro cell radio; and generating one or more messages for each of the one or more small cell radios identifying the one or more sets of optimized power control parameters.

In some instances, each set of optimized power control parameters can include a first power control parameter associated with a power offset for UE transmissions toward a particular small cell radio; and a second power control parameter associated with an amount of UE path loss between UE served by the particular small cell radio that is inverted for UE transmissions toward the particular small cell radio. In some instances, the UE path loss information can include, at least in part, a maximum estimated UE path loss for one or more cell edge UE served by a particular small cell radio; and a maximum estimated UE path loss for one or more cell interior UE served by the particular small cell radio.

In some instances, the macro path loss information can be based, at least in part, on signal strength information for the macro cell radio as measured by one or more UE served by a particular small cell radio. In some instances, the UE path loss information and the macro path loss information can be determined by a particular small cell radio that is experiencing the highest interference from one or more macro UE served by the macro cell radio.

In some cases, determining the one or more sets of optimized power control parameters can further include: calculating, at the central management entity, one or more sets of candidate power control parameters that meet the first interference constraint for one or more Signal to Interference plus Noise Ratio (SINR) threshold values associated with cell edge UE served and one or more SINR threshold values associated with cell interior UE served by a particular small cell radio; determining whether an average of a sum of an expected interference for the one or more UE served by the one or more small cell radios satisfies the second interference constraint for any of the one or more sets of candidate power control parameters; and identifying the one or more sets of optimized power control parameters as those one or more corresponding sets of power control parameters that satisfy the second interference constraint.

Example Embodiments

Referring to FIG. 1A, FIG. 1A is a simplified block diagram illustrating a communication system 100 to facilitate small cell uplink (UL) power control in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

Figure 1B:
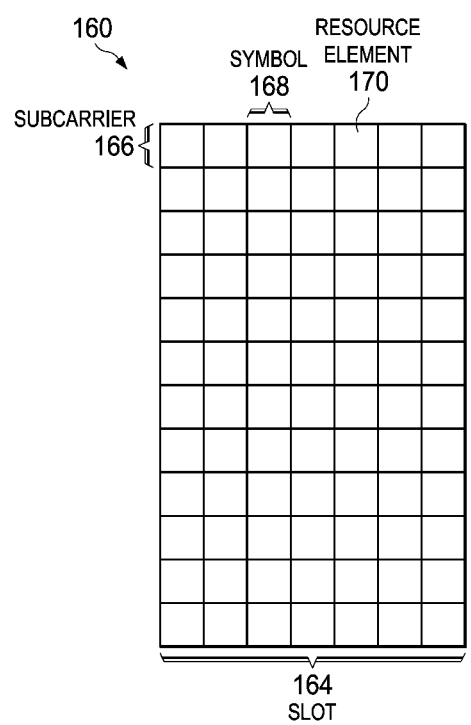
FIG. 1B is a simplified schematic diagram illustrating example details associated with an example resource block that can be associated with uplink transmissions in accordance with one potential embodiment of the communication system.

The example architecture of FIG. 1A can include users operating user equipment (UE) 112a-112d, one or more small cell radio(s) 114a-114b, a macro cell radio 116 a radio access network (RAN) 120, a central management system 122 and a service provider network 130. Central management system 122 can include a central power management module 150. Each small cell radio 114a-114b can be logically connected to central management system 122 and service provider network 130. FIG. 1B is a schematic diagram illustrating various example details that can be associated with communication system 100 and will be discussed in conjunction with FIG. 1A.

Each small cell radio 114a-114b can be associated with a corresponding small cell radio coverage area, as indicated by the respective dashed-line circle surrounding each respective small cell radio 114a-114b. Macro cell radio 116 can be associated with a corresponding macro cell radio coverage area, as indicated by the dashed-line hexagon. In various embodiments, the macro cell radio coverage area for a given macro cell radio (e.g., macro cell radio 116) can overlap, in whole or in part, small cell radio coverage areas for one or more small cell radios (e.g., respective coverage areas for respective small cell radios 114a-114b). It should be understood that the coverage areas shown in FIG. 1A are provided for illustrative purposes only, and are not meant to limit the broad scope of the teachings of the present disclosure. Any other coverage areas (e.g., coverage area size/range) can be provided by cell radios within the scope of the present disclosure.

In various embodiments, UE 112a-112d can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 112a-112d may also be inclusive of a suitable interface to a human user such as a microphone, a display, a keyboard, or other terminal equipment.

UE 112a-112d may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In some embodiments, UE 112a-112d may have a bundled subscription for network access and application services (e.g., voice), etc. Once the access session is established, the user can register for application services as well, without additional authentication requirements. UE IP addresses can be assigned using dynamic host configuration protocol (DHCP), Stateless Address Auto-configuration, default bearer activation, etc., or any suitable variation thereof. In various embodiments, each UE 112a-112d can include one or transmitters and/or receivers (e.g., transceivers) and one or more antenna(s) to facilitate over the air communications with one or more small cell radios 114a-114b and/or macro cell radio 116.

In various embodiments, interfaces and/or a series of interfaces can be provided in communication system 100 (e.g., for elements of communication system 100), which can offer interoperation for mobility, policy control, uplink power control, interference mitigation or other operations between various elements of communication system 100. For example, interfaces can be used to exchange point of attachment, location, and/or access data for one or more end users, for example, users operating UE 112a-112d. In various embodiments, resource information, accounting information, location information, access network information, network address translation (NAT) control, etc. can be exchanged using a remote authentication dial in user service (RADIUS) protocol or any other suitable protocol where appropriate. Other protocols that can be used in communication system 100 can include DIAMETER protocol, service gateway interface (SGi), terminal access controller access-control system (TACACS), TACACS+, etc. to facilitate communications. In various embodiments, small cell radios 114a-114b may logically be connected to each other via an X2 interface (not shown in FIG. 1), as defined in 3GPP standards.

RAN 120 is a communications interface between UE (e.g., 112a-112d) and service provider network 130 via small cell radios 114a-114b and/or macro cell radio 116. Via small cell radios 114a-114b and/or macro cell radio 116, RAN 120 may provide one or more coverage areas for servicing multiple end users and for managing their associated connectivity. The communications interface provided by RAN 120 may allow data to be exchanged between an end user and any number of selected elements within communication system 100. For example, RAN 120 may facilitate the delivery of a request packet (e.g., request for service(s)) generated by a given UE (e.g., UE 112a) and the reception of information sought by an end user. In various embodiments, RAN 120 may include 3GPP access networks such as, for example, Global System for Mobile Communications (GSM) Enhanced Data Rates for GSM Evolution (EDGE) Radio Access Network (GERAN), generally referred to as 2G; Universal Mobile Telecommunications System (UMTS) Terrestrial Radio Access Network (UTRAN), generally referred to as 3G; and/or evolved UTRAN (E-UTRAN), generally referred to as 4G, Long Term Evolution (LTE) and/or LTE-Advanced (LTE-A). In various embodiments, RAN 120 may include non-3GPP IP access networks such as digital subscriber line (DSL), Cable, wireless local area network (WLAN) (e.g., Wireless Fidelity (WiFi), Worldwide Interoperability for Microwave Access (WiMAX)) and/or the Internet. RAN 120 is only one example of a communications interface between an end user and service provider network 130. Other suitable types of communications interfaces may be used for any appropriate network design and, further, be based on specific communications architectures in accordance with particular needs.

In general, service provider network 130 represents a series of points or nodes of interconnected communication paths for receiving and transmitting packets of information that may propagate through communication system 100. In various embodiments, service provider network 130 can be configured according to 3GPP standards to include one or more elements of an Evolved Packet Core (EPC), a packet-switched (PS) architecture and/or a circuit-switched (CS) architecture as prescribed by 3GPP standards in order to provide services (e.g., voice, data, multimedia, etc.) and interconnectivity to UE 112a-112d to one or more packet data networks (e.g., the Internet).

In various embodiments, service provider network 130 may offer communicative interfaces between UE 112a-112d and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. In various embodiments, communication system 100 may implement a user datagram protocol (UDP)/Internet protocol (UDP/IP) connection and use a transmission control protocol (TCP/IP) communication language protocol in particular embodiments of the present disclosure. However, any other suitable communication protocol for transmitting and receiving data packets within communication system 100 may be alternatively implemented.

In various embodiments, macro cell radio 116 can be deployed as an evolved Node B (eNodeB or eNB), which can provide cellular/mobile coverage for a 4G/LTE macro cell network, or a Node B (NodeB), which can provide cellular/mobile coverage for a 2G/3G macro cell network. In general a NodeB is deployed in conjunction with a Radio Network Controller (RNC), which may provide radio control for the NodeB. In various embodiments, macro cell radio 116 can be responsible for selecting a Mobility Management Entity (MME) or a serving General Packet Radio Service (GPRS) support node (SGSN) within service provider network 130 for session establishment for each UE served by macro cell radio 116 (e.g., UE 112d), for managing radio resources for such UE, and making handover decisions for such UE, for example, handover to other cell radios (e.g., eNodeBs and/or HeNBs).

In various embodiments, small cell radios 114a-114b can be deployed as home evolved NodeBs (HeNBs), which can provide cellular/mobile coverage for a 4G/LTE small cell network, and/or can be deployed has Home Node Bs (HNBs), which can provide cellular/mobile coverage for a 2G/3G small cell network. In some embodiments, small cell radios 114a-114b can be deployed as 'single-stack' devices offering 4G/LTE or 2G/3G connectivity, 'dual-stack' devices offering 4G/LTE or 2G/3G connectivity and WiFi/WiMAX connectivity, or 'triple-stack' offering 4G/LTE connectivity, 2G/3G connectivity and WiFi/WiMAX connectivity.

Typically, small cell radios operate at lower power levels as compared to macro cell radios to provide services to proximate users, for example, within in a business or residential environment (e.g., within a building, home, etc.). In some embodiments, small cell radios (e.g., 114a-114b) can be deployed in business (e.g., enterprise) environments within predefined clusters, grids or groups that can be optimized to provide contiguous or overlapping cellular/mobile coverage for enterprise users (e.g., employees, visitors, etc.) when such users are located within a coverage area of small cell radios deployed in such a cluster/grid. In some embodiments, small cell radios can be deployed in residential or densely populate environments to provide cellular/wireless connectivity in areas where macro cell radio coverage area(s) may be limited and/or overloaded.

In some embodiments, small cell radios 114a-114b can interface with service provider network 130 via one or more small cell gateways (not shown), which can be used to aggregate and/or manage sessions for UE connected to the small cell network. Small cell radios can be connected using a standard broadband digital subscriber line (DSL), internet or cable service into service provider network 130 via the one or more small cell gateways. Calls can be made and received, where the signals are sent (potentially encrypted) from a given small cell radio via the broadband Internet protocol (IP) network to one of the service provider's main switching centers. In some embodiments, small cell radios 114a-114b can also interface with a small cell management system, which can be used to manage configurations (e.g., communication protocols, data models, etc.) for small cell radios 114a-114b. In some embodiments, the small cell management system can be included within central management system 122 or can be provided separate from central management system. In various embodiments, each small cell radio 114a-114b can include one or transmitters and/or receivers (e.g., transceivers) and one or more antenna(s) to facilitate over the air communications with one or more UE served thereby.

As referred to herein in this Specification, a 'small cell radio' (e.g., small cell radio 114a, 114b) can be referred to interchangeably as a 'small cell', a 'femtocell' or a 'pico cell'. As referred to herein in this Specification, a 'macro cell radio' (e.g., macro cell radio 116) can be referred to interchangeably as a 'macro cell', a 'macro radio' or a 'macro'. As shown in FIG. 1A, UE 112a-112d may be served (e.g., logically connected to via an over-the-air interface) by a serving or source small cell or macro cell radio, as indicated by the solid line between each UE and a corresponding small cell or macro cell radio (e.g., UE 112a-112b served by small cell radio 114a; UE 112c served by small cell radio 114b; and UE 112d served by macro cell radio 116).

As shown in FIG. 1A, central management system 122 can further include central power management module 150, which can, in various embodiments, aid in coordinating small cell uplink power control and/or resource management for small cell radios 114a-114b serving UE 112a-112c. In various embodiments, central management system 122 can be deployed as any central management entity, such as, for example, an Operations, Administration and Maintenance (OAM) entity, a Radio Management System (RMS), a Radio Resource Manager (RRM), a Self-Organizing Network (SON) management system, combinations thereof or the like. In certain embodiments, an RMS can be used in conjunction with small cell deployments, for example, to configure small cell radios 114a-114b according to a particular communications protocol (e.g., technical report (TR) 069) and data model (e.g., TR-196 version 2).

In some embodiments, a SON management system can have visibility of, and/o may interface with one or more parallel networks such as, for example, a macro cell network, a small cell network, a wireless local area network (WLAN), etc. and can be used to coordinate uplink power control and/or resource management for UE associated with small cell radios in a small cell deployment. In essence, a SON management system (e.g., central management system 122, depending on configuration) may provide a system-wide view of communication system 100 and can therefore intelligently provision small cell uplink power control parameters and/or resources among different communication networks in the communication system. Accordingly, central management system 122 can be configured to interface with any element or node of communication system 100 via one or more logical interfaces. In various embodiments, central management system 122 can be deployed within service provider network 130, within cloud-based service (e.g., in a centralized SON (cSON) architecture) and/or can be deployed in a service network for a particular deployment, such as, for example, in an enterprise small cell deployment. In some embodiments, for example, if central management system 122 is configured as a SON management system, macro cell radio 116 may have a logical connection to central management system 122.

Generally, Signal-to-Interference-plus-Noise Ratio (SINR) is used to describe or quantify signal quality for downlink transmissions to UE (e.g., from a serving cell radio to a UE) and/or uplink transmissions from UE (e.g., from a given UE to its serving cell radio). In some embodiments, SINR for a given UE (e.g., any of UE 112a-112d) can be determined or estimated based on one or more of: a Reference Signal Received Quality (RSRQ) as measured by the UE for the Evolved-Universal Terrestrial Radio Access (E-UTRA); a downlink channel quality indicator (CQI) reported by the UE, relative Reference Signal Received Power (RSRP) and/or the received signal strength for an uplink transmission divided by the total interference in the cell. Typically, E-UTRA is described in reference to the air-interface for LTE radio access. In some embodiments, an expected or target SINR can be used in communication system 100 in order to determine and/or control uplink power control parameters for small cell UE, as discussed in further detail herein.

As defined in 3GPP TS 36.214, RSRP is the linear average over the power contributions of resource elements for resource blocks (RBs) that carry cell-specific reference signals (CRS) within a considered measurement frequency bandwidth. RSRQ is defined as the ratio of the number (N) of RBs of the E-UTRA carrier received signal strength indicator (RSSI) measurement bandwidth (e.g., system bandwidth) multiplied by the RSRP divided by the RSSI, generally expressed as 'N*RSRP/RSSI'. In general, a given UE can measure/determine signal strength information such as, for example, RSRP and/or RSRQ for a serving cell and/or non-serving cells (e.g., neighboring cells), if enabled. In certain embodiments, RSRP and/or RSRQ measurements for neighboring cells can be enabled for UE 112a-112d. As used herein the terms 'relative RSRP' and 'relative interference' can be used interchangeably and can refer to a serving cell RSRP as measured by a given UE subtracted from a neighboring cell RSRP as measured by the UE.

It should be noted that any UE signal strength information can be used among various embodiments described within the scope of the present disclosure for determining and/or controlling UE uplink power control parameters. In at least one embodiment, for example, for a 3G deployment, signal strength information can include Common Pilot Channel (CPICH) energy per chip to total PSD at the UE antenna (Ec/Io) and/or CPICH Received Signal Code Power (RSCP) as defined in 3GPP standards. In another embodiment, for example, for a WiFi deployment, signal strength information can include Received Signal Strength Indicator (RSSI), Received Channel Power Indicator (RCPI), combinations thereof, or other similar signal strength information. Accordingly, although many of the example embodiments discussed herein are described with reference to RSRP and/or RSRQ signal strength information, it should be understood that signal strength information as discussed for the various embodiments described herein can cover a multitude of access network types including both 3GPP and non-3GPP access networks.

In certain embodiments, downlink channel quality indicator (CQI) reported by a UE can be used to determine downlink SINR by using the CQI reported for a given UE as a proxy for determining downlink SINR. Generally, the CQI reported by a UE may be used to determine the Modulation and Coding Scheme (MCS) at which the cell radio to which the UE is connected needs to transmit packets to the UE such that the UE will receive packets at a 10% Block Error Rate (BLER). If an Average White Gaussian Noise (AWGN) channel is assumed for the UE, an SINR can be determined that will lead to a 10% BLER based on the MCS chosen by the cell radio for downlink transmissions to the UE via the Physical Downlink Shared Channel (PDSCH), which carries data transport blocks (e.g., RBs) to the UE. Generally, each MCS from which the cell radio can choose for downlink transmissions can be mapped to one or more SINR values or a range of SINR values, thereby enabling SINR determinations using the MCS chosen for downlink transmissions. Although UE manufacturers often implement different receivers, etc. for their equipment, which can lead to non-one-to-one MCS to SINR mappings, CQI can be used to determine an approximate SINR for a given UE based on the assumption that, as SINR increases for a UE, CQI can also increase because the UE can decode higher order modulation schemes while staying within the 10% BLER threshold.

Under an assumption of approximate uplink and downlink symmetry for a given UE, uplink or downlink SINR can be used for various embodiments described herein. MCS can also be selected for UE for uplink transmissions. As provided by 3GPP standards (e.g., TS 36.111), MCS for uplink UE transmissions can include Quadrature Phase Shift Keying (QPSK) and Quadrature Amplitude Modulation (QAM) including 16QAM, 64QAM and 256QAM with modulation order increasing from QPSK to 256QAM.

As illustrated FIG. 1A, UE 112a-112b may be located in relative proximity within the coverage area of small cell radio 114a, which may be the serving or source cell radio for UE 112a-112b, as indicated by the solid line indicating interconnection between UE 112a-112b and small cell radio 114a. In various embodiments, UE 112a may be determined by small cell radio 114a to be a cell interior UE within the coverage area of small cell radio 114a and UE 112b may be determined to be a cell edge UE within the coverage area of small cell radio 114a. UE 112c may be located in relative proximity within the coverage area of small cell radio 114b, which may be the serving or source cell radio for UE 112c, as indicated by the solid line indicating interconnection between UE 112c and small cell radio 114b. UE 112c may be determined by small cell radio 114b to be a cell edge UE within the coverage area of small cell radio 114b. It should be understood, however, that the location of UE 112a-112c in relation to small cell radio 114a-114b is provided for illustrative purposes only and is not meant to limit the broad scope of the present disclosure. It should be understood that UEs can be distributed anywhere within the coverage areas of small cell radios 114a-114b within the scope of the teachings of the present disclosure.

In some embodiments, determinations of whether a given UE is a cell edge UE can be performed by a given serving small cell radio (e.g., small cell radio 114a) by determining the received power for an uplink signal from a given UE divided by the interference in the cell in comparison to an expected or target SINR threshold (Target_SINR$_{CELL\_EDGE}$) for cell edge UE. In some embodiments, the determination can include a dividing RSRP of the serving cell as measured by the UE by uplink RSSI for the UE minus RSRP of the serving cell radio and comparing the result to the Target_SINR$_{CELL\_EDGE}$. For example, if (serving_cell_RSRP)/(RSSI−serving_cell_RSRP)<Target_SINR$_{CELL\_EDGE}$, then a given UE may be a cell edge UE. In various embodiments, Target_SINR$_{CELL\_EDGE}$ can be varied in a range from approximately 5 decibel (dB) to approximately 10 dB, depending on expected interference and/or path loss for a small cell radio deployment under an assumption of at least two neighboring small cell radios and empirical data available.

In some embodiments, determination of whether a given UE is a cell interior UE can be performed by a given serving small cell radio (e.g., small cell radio 114a) using a similar comparison in relation to an expected or target SINR threshold (target_SINR$_{CELL\_INT}$) for cell interior UE. For example, if (serving_cell_RSRP)/(RSSI−serving_cell_RSRP)>target_SINR$_{CELL\_INT}$, then a given UE may be a cell interior UE. In various embodiments, target_SINR$_{CELL\_INT}$ can be varied in a range from approximately 10 dB to approximately 15 dB, depending on expected interference and/or path loss for a small cell radio deployment and empirical data available.

In various embodiments, cell edge UE or cell interior UE determinations can be facilitated using other information including, but not limited to, using one or more of: a channel quality indicator (CQI) reported by the UE for downlink communications (e.g., communications from the small cell radio toward the UE) and/or a reference signal received quality (RSRQ) as measured by the UE and performing CQI and/or RSRQ comparisons to a predetermined threshold.

In various embodiments, each small cell radio 114a-114b may manage scheduling for uplink radio resources for uplink transmissions for each corresponding UE 112a-112c that the small cell radios respectively serve. Uplink radio resources may be those resources transmitted over an air interface by a particular UE (e.g., using one or more combinations of transmitters and/or antenna(s)) to be received by its serving cell radio (e.g., using one or more combinations of receivers and/or antenna(s)). For example, in certain embodiments, assuming UE 112a-112b are connected to and currently served by small cell radio 114a, small cell radio 114a can schedule uplink resources for uplink transmissions that may be carried out by UE 112a-112b. In turn, UE 112a-112b can perform uplink transmissions as scheduled by small cell radio 114a. Typically, uplink transmissions are scheduled via uplink grants that can be communicated by a serving cell radio to a corresponding UE. Similar uplink transmissions can be scheduled for UE 112c by small cell radio 114b and for UE 112d by macro cell radio 116.

In certain embodiments, LTE architectures can support multi-user access using Orthogonal Frequency-Division Multiple Access (OFDMA), which is a multi-user version of the orthogonal frequency-division multiplexing (OFDM) digital modulation scheme. Multiple accesses are achieved in OFDMA by assigning subsets of subcarriers to individual users. OFDMA allows for simultaneous transmissions from several users served by a particular cell radio. In certain embodiments, LTE architectures can also support multi-user access using Single Carrier Frequency Division Multiple Access (SC-FDMA), which is similar to OFDMA, but includes additional precoding.

Generally in LTE architectures, a given serving cell radio (e.g., small cell radio 114a) can schedule uplink transmissions for a given UE (e.g., UE 112a) by scheduling physical resource blocks, generally referred to as resource blocks (RBs), that are to be transmitted by the UE according to one or more uplink grants, as noted above. For example, using one or more uplink grants, small cell radio 114a can signal to the UE, when it can transmit uplink RBs or resources toward small cell radio 114a. Uplink grants are typically communicated to the UE via a physical downlink control channel (PDCCH) maintained between the UE and the serving cell radio. Typically, the PDCCH can be used to communicate information related to information downlink (DL) grant(s), uplink (UL) grant(s), power control, system configuration, random access, paging, etc. for UE.

An RB, as defined in 3GPP technical specification (TS) 36.211, is typically represented by a number of resource elements, each of which can be allocated within a symbol, for each of a particular subcarrier (e.g., frequency) that can be associated with a particular UE. An RB can generally be referred to as a 'slot' spanning 0.5 milliseconds (msec) of a 1 msec subframe. Thus, there are typically two RBs in each 1 msec subframe. The smallest unit of an RB is a resource element, which represents one subcarrier by one symbol. Thus, a RB can be schematically represented as spanning a portion of frequencies of system bandwidth (e.g., depending on the number of subcarriers in the RB) across a span of time (e.g., 0.5 msec) for each symbol included in the RB. For 4G/LTE, the number of subcarriers for an RB is 12, each spanning a 15 kilohertz (15 KHz subcarrier bandwidth), thus each RB represents a 180 KHz portion of system bandwidth. As system bandwidth can vary, such as, for example, between 1.25 megahertz (MHz) and 20 MHz, the number of available RBs that can be scheduled or allocated across UEs can vary, respectively between 6 and 100. Typically, a 10 MHz bandwidth corresponds to 50 available RBs that can be allocated to UEs served by a particular cell. It should be understood that RBs can be uplink RBs or downlink RBs, depending on the device transmitting the RBs.

Referring to FIG. 1B, FIG. 1B is a simplified schematic diagram illustrating an example uplink RB 160 that can be used for uplink transmissions in accordance with one potential embodiment of the communication system. Uplink RB 160 can represents a 0.5 msec slot 164 of a 1 millisecond (msec) transmission time interval (TTI) for a number of symbols 168 spread across a number of subcarriers 166. In various embodiments, the number of subcarriers 166 is typically 12. In various embodiments, the number of symbols 168 can depend on the cyclic prefix type for uplink transmissions (e.g., 12 symbols for normal cyclic prefix or 14 for symbols for extended cyclic prefix). As noted, the smallest unit of a RB is a resource element, shown in FIG. 1B as resource element 170, which represents one subcarrier 166 by one symbol 168.

Before detailing some of the operational aspects of FIG. 1A, it is important to understand common characteristics of uplink interference that can occur in mobile communication networks. The following foundation is offered earnestly for teaching purposes only and, therefore should not be construed in any way to limit the broad teachings of the present disclosure.

Uplink data (e.g., RBs) can be transmitted by a given UE (e.g., UE 112a) using a Physical Uplink Shared Channel (PUSCH), a Physical Uplink Control Channel (PUCCH) or a Physical Random Access Chanel (PRACH). Uplink transmissions by UE can cause interference, typically referred to as power spectral density (PSD) interference or interference PSD, to a particular serving cell radio and/or to one or more neighboring cell radios. Interference, as represented herein using the symbol 'I', can be quantified as interference over thermal noise (IoT), which is the ratio of interference PSD to thermal noise PSD. Thermal noise PSD, as defined in 3GPP TS 26.214, is the white noise PSD on the uplink carrier frequency multiplied by the uplink system bandwidth. As referred to herein in this Specification the terms 'IoT' and 'interference' may be used interchangeably.

As noted, uplink transmissions from a UE to its serving cell can cause interference toward one or more neighboring cells. Interference caused to small cell deployments can include small cell to small cell interference from neighboring small cells, and/or macro to small cell interference from neighboring macro cells. In addition, cell edge UE in small cell deployments can cause interference not only to other small cells but also to surrounding macro cells (e.g., small cell to macro cell interference). For various embodiments described herein, it may be assumed that cell interior UE for small cell deployments may not contribute in a significantly quantifiable amount to small cell to small cell interference and/or to small cell to macro cell interference.

As referred to herein in this Specification, small cell to small cell interference can be denoted using the term '$I_{SMALL}(c)$', which may represent the IoT due to other small cell UE for neighboring small cell radios as measured at a particular small cell radio 'c'. In various embodiments, $I_{SMALL}(c)$ can be assumed to not exceed approximately 3 dB over noise; thus, $I_{SMALL}(c)$ can be set to 3 dB over noise for various equations as described herein for various embodiments. However, it should be understood that $I_{SMALL}(c)$ can be other values. As referred to herein in this Specification, macro cell to small cell interference can be denoted using the term '$I_{MACRO}(c)$', which may represent the IoT due to macro UEs as measured at a particular small cell radio 'c' and may be expressed as dB over noise.

For example, cell edge UE 112c served by small cell radio 114b can cause interference toward small cell radio 114a, shown in FIG. 1A as $I_{SMALL}(114a)$, which may represent the IoT due to cell edge UE 112c as measured at small cell radio 114a. Cell edge UE 112b served by small cell radio 114a can cause interference toward small cell radio 114b, shown in FIG. 1A as $I_{SMALL}(114b)$, which may represent the IoT due to cell edge UE 112b as measured at small cell radio 114b. Further, macro UE 112d may also cause interference toward small cell radio 114a and/or small cell radio 114b. The IoT due to macro UE 112d as determined by small cell radio 114a is represented as $I_{MACRO}(114a)$. As noted, macro UE 112d may also cause interference toward small cell radio 114b, however, this is not shown in FIG. 1A in order to illustrate other features of communication system 100.

As noted, cell edge UE for small cell deployments can also cause interference towards surrounding macro cells (e.g., small cell to macro cell interference). As referred to herein in this Specification, small cell to macro cell interference can be denoted using the term '$IoT_{SMALL \rightarrow MACRO}$', which may represent the IoT due to small cell UEs toward neighboring macro cell radio(s). In various embodiments, one dominant macro cell radio (e.g., macro cell radio 116) may be determined to be in the vicinity of a cluster or group of neighboring small cell radios (e.g., small cell radios 114a-114b). In various embodiments, the determination of a dominant macro cell radio can be based on real-time measurements, deployment, operator configuration, combinations thereof or the like.

For LTE, 3GPP specifications define different interference mitigation schemes such as, for example, interference reduction and inter cell interference coordination (ICIC). Interference reduction is typically associated with optimizing coverage and capacity for a network. ICIC is typically associated with the management of radio resources to mitigate inter cell interference. In the frequency domain, ICIC is often used to manage the allocation of RBs between cells in order to coordinate the use of frequency domain resources. In particular, frequency domain ICIC can be used to mitigate inter cell interference with neighboring cells for UEs located at the edge of a coverage area of a given serving cell (e.g., cell edge UEs) that may have resources allocated thereto, which can interfere with the neighboring cells.

In addition to ICIC techniques, managing uplink UE power control for small cell deployments, as provided by various embodiments of communication system 100, can also be used to mitigate adverse effects of small cell to small cell interference and/or macro cell to small cell interference. In particular, uplink power control techniques as provided by various embodiments of communication system 100 can be used maximize small cell uplink SINR for small cell deployments while maintaining and/or limiting interference to neighboring macro cell deployments.

Generally, uplink power control for UE transmissions involves setting open loop power control parameters for a cell radio. A first power control parameter, often identified to as '$P_0$' in 3GPP specifications, generally identifies a transmit power offset value for UE uplink transmissions and a second power control parameter, often identified as '$\alpha$' in 3GPP specifications, generally identifies an amount of path loss (PL) between UE and a serving cell radio that is inverted for UE transmissions toward the serving cell. For small cell deployments, it is generally desirable to scale $\alpha$ as UE move further from their serving small cell radio. For example, as UE move into the cell edge of a small cell radio, it is generally desirable to increase $\alpha$ in order to increase the amount of downlink power inverted by the UE for uplink transmissions in order to maintain an expected or target SINR for cell edge UE. In various embodiments, $\alpha$ can range from zero (0), in which case UE transmit power is controlled solely by $P_0$, to one (1), in which case the serving small cell radio downlink power is fully inverted for UE uplink transmit power. Yet, increasing $\alpha$ can cause interference caused by cell edge UE toward neighboring small cells and/or neighboring macro cells (e.g., little interference may be caused if a small cell radio is deployed near the edge of a macro cell coverage area, but greater interference may be caused if a small cell radio is deployed near the interior of a macro cell coverage area).

In current deployments, uplink UE power control typically assumes: 1) that power control for all uplink transmissions is provided using a common algorithm and/or 2) that small cells provide power control to meet macro cell constraints (e.g., to limit small cell to macro cell interference), yet current deployments often apply a uniform power restriction across all UE (e.g., cell interior and cell edge) served by a given small cell radio. The first assumption typically used for uplink power control in current deployments is inapplicable to deployments in which small cell and macro cell deployments overlap because macro cell power is often fixed, which can lead to limitations being on small cell uplink SINR in order to meet small cell to macro cell interference constraints. The second assumption typically used for uplink power control in current deployments in which a uniform power restriction is applied across all small cell UE can lead to suboptimal uplink SINR for cell edge UE for small cell deployments that may be at the edge of a macro cell radio coverage area for a given macro cell radio but in reality may cause little interference toward the macro cell radio.

In accordance with at least one embodiment, communication system 100 is configured to provide a system and method to facilitate small cell uplink power control through coordination and management of uplink power control parameters for small cell radios 114a-114b via central management system 122. In various embodiments, the method provided by communication system 100 may facilitate small cell uplink power control through optimizing power control parameters for small cell uplink UE transmissions through interference coordination between small cell radios 114a-114b and central management system 122 as well as through interference coordination between small cell radio 114a and small cell radio 114b. In various embodiments, the method provided by communication system 100 can be carried out using one or more hardware processors configured for small cell radios 114a-114b and/or central management system 122.

During operation, in at least one embodiment, the method provided by communication system 100 may provide for determining one or more set(s) of optimized power control parameters, $P_0$ and $\alpha$, for small cell radios 114a-114b to set absolute uplink power levels for small cell UE served by small cell radios 114a-114b that may overcome interference caused toward the small cell radios from UE associated with a given macro cell radio (e.g., UE 112d associated with macro cell radio 116) while limiting interference caused by the small cell UE towards the macro cell radio. In various embodiments, communication system 100 can provide for determining one or more set(s) optimized power control parameters for small cell radios 114a-114b using various operational architectures.

First Operational Architecture

Under a first operational architecture, determining one or more set(s) of optimized power control parameters can include one or more of small cell radios 114a-114b determining one or more set(s) of candidate power control parameters (e.g., one or more set(s) of $P_0$ and $\alpha$) based on a first interference constraint that is associated, at least in part, with interference caused toward each small cell radio 114a-114b by one or more macro cell UE. In general, the first interference constraint can be used to determine set(s) of candidate power control parameters that may provide for small cell UE uplink power levels that may overcome the interference caused by macro UEs towards the small cell radio(s), while limiting interference that may be caused toward neighboring small cell radio(s). The first interference constraint is described in more detail below with regard to Equation 1.

The one or more set(s) of candidate power control parameters can be communicated to central management system 122. Under the first operational architecture, central management system 122, via central power management module 150, can use the one or more set(s) of candidate power control parameters to determine one or more set(s) of optimized power control parameters according to a second interference constraint that provides for limiting the maximum interference caused toward macro cell radio 116 according to a maximum interference threshold for '$IoT_{SMALL \rightarrow MACRO}$', denoted herein as '$IoT_{SMALL \rightarrow MACRO}^{MAX}$'. The second interference constraint is described in more detail below with regard to Equation 2.

Central management system 122 can communicate the one or more set(s) of optimized power control parameters to small cell radios 114a-114b, each of which may then set relative power levels for each corresponding UE served thereby (e.g., UE 112a-112b for small cell radio 114a, UE 112c for small cell radio 114b) according to various ICIC considerations to provide interference mitigation between the small cell radios.

Various embodiments that can be associated with the first architecture in which one or more small cell radio(s) 114a-114b can determine one or more set(s) of candidate power control parameters are now discussed. In various embodiments, the first interference constraint, as discussed in further detail below via Equation 1, can be applied to both cell interior UE and cell edge UE served by a given small cell radio 'c' in order to determine one or more set(s) of candidate power control parameters associated with small cell radio 'c'. In various embodiments, the first interference constraint can be applied to cell edge UE and cell interior UE using corresponding target SINR values received from central management system 122 and/or according to an indication received from central management system 122 (e.g., to decrease or increase corresponding target SINR value(s)).

In some embodiments, each of one or more small cell radio 114a-114b can be tasked or selected to calculate one or more set(s) of candidate power control parameters to feed to central management system 122. In various embodiments, each of a set of candidate power control parameters, $P_0$, and $\alpha$, as calculated by each of a given small cell radio can be indexed such that central management system 122 can associate each of the given set of power control parameters to the appropriate small cell radio. In some embodiments, cell identity (ID) can be used to index each $P_0$, and $\alpha$. In various embodiments, cell ID can include a Primary Scrambling Code (PSC) (e.g., for 3G deployments), Physical Cell Identifier (PCI) (e.g., for 4G deployments), combinations thereof or the like.

In some embodiments, a particular small cell radio can be tasked or selected to provide one or more set(s) of candidate power control parameters to central management system 122. For example, a small cell radio that is determined to experience the highest interference from macro UEs associated with a dominant macro cell radio can be selected to determine one or more set(s) of candidate power control parameters to communicate to central management system 122.

Upon determining the one or more set(s) of candidate power control parameters, the small cell radio(s) may generate one or more messages toward central management system 122 including the one or more set(s) of candidate power control parameters. Based on the one or more set(s) of candidate power control parameters, central management system 122, via central power management module 150, can determine a set of optimized power control parameters according to a second interference constraint that provides for limiting the maximum interference caused toward macro cell radio 116 according to the maximum interference threshold '$IoT_{SMALL \rightarrow MACRO}^{MAX}$'. In general, central management system 122 may determine whether a given set of candidate power control parameters provide for meeting the second interference constraint such that an average of a sum of expected interference that may be caused by small cell UE toward the macro cell radio remains below the maximum interference threshold '$IoT_{SMALL \rightarrow MACRO}^{MAX}$'. The second interference constraint is described in more detail below with regard to Equation 2.

For the first operational architecture, the generation of candidate power control parameters by small cell radio(s) 114a, 114b can be performed using different techniques. In some embodiments, one or more small cell radio 114a-114b may calculate one set of candidate power control parameters that meet the first interference constraint and may generate one or more messages communicating the candidate power control parameters to central management system 122. In turn, central management system 122 may determine whether the set of candidate power control parameters provide for meeting the second interference constraint. If it is not met, central management system 122 may task the one or more small cell radio 114a-114b to reduce the cell interior UE SINR threshold value and/or the cell edge UE SINR threshold value to calculate a new set of candidate power control parameters. In various embodiments, the reduction can be in whole or fractional values.

In some cases, for example, the cell interior SINR value alone can be reduced if the current cell interior SINR value is greater than the current cell edge SINR value. In other cases, both the cell interior SINR value and the cell edge SINR value can be reduced if the current cell interior SINR value is equal to the current cell edge SINR value. This iterative operation may continue until central management system 122 determines one or more set(s) of optimized power control parameters that meet the second interference constraint, in which case central management system 122 can generate one or more messages toward each of small cell radio 114a-114b including the set(s) of optimized power control parameters in order for the small cell radios to set absolute uplink power levels for UE served thereby.

In other embodiments, one or more small cell radio 114a-114b may calculate multiple sets of candidate power control parameters that meet the first interference constraint according to different combinations of cell interior UE SINR threshold values and cell edge UE SINR threshold values and may generate one or more messages communicating the sets of candidate power control parameters to central management system 122. In turn, central management system 122 may search the sets of candidate power control parameters in order to determine one or more set(s) of optimized power control parameters that meet the second interference constraint. In various embodiments, multiple sets of candidate power control parameters may be found to meet the second interference constraint, in which cases central management system 122 may determine multiple sets of optimized power control parameters. Upon determining the one or more set(s) of optimized power control parameters, $P_0$ and $\alpha$, central management system 122 can generate one or more messages toward each of small cell radio 114a-114b including the one or more set(s) of optimized power control parameters to set absolute uplink power levels for UE associated with the small cell radios.

In various embodiments, upon receiving set(s) of optimized power control parameter(s), each small cell radio 114a-114b may set relative power levels for each corresponding UE served thereby (e.g., UE 112a-112b for small cell radio 114a, UE 112c for small cell radio 114b) according to various ICIC considerations to provide interference mitigation between the small cell radios. Various ICIC considerations associated with setting relative uplink UE power levels according to various embodiments are described more detail below. In various embodiments, the system and method provided by communication system 100 may provide for efficient interference mitigation between small cell UEs while at the same time maintaining just enough power to overcome interference caused by macro cell UEs in the vicinity of the small cell UEs.

Second Operational Architecture

Under a second operational architecture, determining one or more set(s) of optimized power control parameters can include one or more small cell radios 114a-114b determining an estimated path loss (PL) with a dominant macro cell radio and determining an estimated path loss with one or more UE served by the one or more small cell radios. Similar to the various embodiments discussed for the first operational architecture, the second operational architecture can also be varied in that each small cell radio can be tasked or selected to determine estimated path loss information or a particular small cell radio (e.g., that is determined to experience the highest interference from UEs associated with a dominant macro cell radio) can be tasked with determining the estimated path loss information.

The one or more small cell radios 114a-114b can send the estimated path loss information to central management system 122. In various embodiments, the path loss information can be indexed by cell ID. Upon receiving the path loss information, central management system 122 can determine one or more set(s) of optimized power control parameters. Similar to the first operational architecture, under the second architecture, central management system 122 can communicate the one or more set(s) of optimized power control parameters to small cell radios 114a-114b, each of which may then set relative power levels for each corresponding UE served thereby (e.g., UE 112a-112b for small cell radio 114a, UE 112c for small cell radio 114b) according to various ICIC considerations to provide interference mitigation between the small cell radios.

Under the second operational architecture, central management system 122, via central power management module 150, can determine the one or more set(s) of optimized power control parameters based on application of both the first and second interference constraints. In essence, central management system 122 can use the estimated path loss information to generate one or more set(s) of candidate power control parameters using the first interference constraint and can then determine one or more set(s) of optimized power control parameters which meet the second interference constraint. Thus, the second operational architecture differs from the first operational architecture in that calculations according to the first and second interference constraints can be localized to central management system. In various embodiments, the second operation architecture may provide for reduced signaling between central management system 122 and one or more small cell radios 114a-114b over the first operational architecture in order to determine one or more set(s) of optimized power control parameters.

The second operational architecture can also provide for different operating variations. In some embodiments, central management system 122, via central power management module 150, can calculate, in an iterative manner, a set of candidate power control parameters that meet the first interference constraint using the path loss information and SINR threshold values (e.g., for cell edge and cell interior UEs) and can then determine whether the candidate power control parameters meet the second interference constraint. This iterative calculate and check processing can continue by adjusting the SINR threshold values (e.g., increasing or decreasing in varying increments) until one or more set(s) of optimized power control parameters are determined. In embodiments, the one or more set(s) of candidate power control parameters and the one or more set(s) of optimized power control parameters can be indexed to correspond to particular small cell radios or can be calculated as a general set, applicable to all small cell radios in a particular small cell deployment.

In some embodiments, central management system 122, via central power management module 150, can determine multiple sets of candidate power control parameters that meet the first interference constraint using the path loss information across different SINR threshold values. Once the multiple sets of candidate power control parameters are determined, central management system can search the sets to determine one or more set(s) of optimized power control parameters.

Different variations of estimated path loss information can also be calculated by one or more small cell radios 114a-114b. In some embodiments, a maximum estimated path loss among cell edge UE and a maximum estimated path loss among cell interior UE served by a particular small cell radio can be determined by the particular small cell radio. The particular small cell radio can then communicate the maximum estimate path loss among cell edge UE and the maximum estimated path loss among cell interior UE to central management system 122, which can determine one or more set(s) of optimized power control parameters as discussed herein In various embodiments, a function '$PL_{UE}$ (c, u)' can be used to calculate path loss between a given UE 'u' and a given small cell radio 'c' (either a serving or a neighboring small cell radio) according to the expression: '$RSRP_u = TX\_Power(c) - PL_{UE}(c, u)$' where '$RSRP_u$' is the RSRP as reported to small cell radio 'c' by UE 'u' and 'TX_Power(c) is the transmit power of small cell radio 'c' (known by the small cell radio). In various embodiments, another function '$MAX_{u \in U(c)} PL_{UE}(c, u)$' may be used to determine the maximum path loss (PL) for a given UE 'u' among a set of UEs 'U(c)' (e.g., cell interior UE or cell edge UE) served by a given small cell radio 'c' (e.g., small cell radio 114a, 114b). Thus, for all UE served by a given small cell radio, the given small cell radio can determine a set of one or more UE that may be cell edge UE (e.g., based on comparisons to a target cell edge UE SINR threshold) and may determine from that set a corresponding cell edge UE exhibiting a maximum path loss with the small cell radio. A similar maximum path loss determination/calculation can also be performed to determine a maximum path loss among cell interior UE served by the small cell radio.

In some embodiments, estimated path loss information for each UE served by a given small cell radio can be communicated to central management system 122, which can filter (e.g., to determine maximum path loss for any UE, cell edge UE or cell interior UE served by the small cell radio) or process the estimated path loss information in order to determine one or more set(s) of optimized power control parameters as discussed for the various embodiments described herein.

In various embodiments, the path loss from a given dominant macro cell radio (e.g., macro cell radio 116) to a given small cell radio 'c' (e.g., small cell radio 114a, 114b) can be represented as '$PL_{macro}(c)$'. In various embodiments, certain assumptions can be made, which may aid in determining an estimated macro path loss for a given small cell radio 'c'. In some embodiments, one assumption may include assuming that the macro path loss, '$PL_{macro}(c)$', from a given macro cell radio to a given small cell radio 'c' may be approximately the same as the path loss from UE associated with the small cell radio to the macro cell radio. Thus, in some embodiments, '$PL_{macro}(c)$' may be based on measurement reports (e.g., RSRP measurement reports) received from UE served by the small cell radio. In other embodiments, '$PL_{macro}(c)$' may be based on network listen operations performed by a given small cell radio (e.g., the small cell radio 'listening' for over-the-air transmissions from neighboring small cell radios via its internal receiver).

In various embodiments, another assumption can include that there exists one dominant macro cell radio in the vicinity of a cluster or group of neighboring small cell radios. In various embodiments, it is assumed that small cell radios 114a-114b are provided or configured with cell ID information (e.g., PSC, PCI, Cell Global Identifier (CGI), E-UTRAN Cell Global Identifier (ECGI), etc.) to enable identification of a dominant macro cell radio via UE measurement reports and/or network listen operations.

Interference Constraints

A further analysis of the first and second interference constraints is now provided. It should be understood that the first and second interference constraints can be applied under both the first and second operational architectures. Turning to the first interference constraint, the first interference constraint may, in various embodiments, relate interference caused toward one or more small cell radios 114a-114b by one or more macro cell UE (e.g., macro UE 112d) in order to determine one or more set(s) of candidate power control parameters that may provide for small cell UE transmit power levels that may overcome the interference caused by the one or more macro UE, while limiting interference that may be caused toward neighboring small cell radio(s). The first interference constraint can be represented as shown below in Equation 1.

$$P_0 + (\alpha - 1) MAX_{u \in U(c)} PL_{UE}(c,u) \geq \text{Total\_Interf} + \Delta \qquad \text{Eq. 1}$$

For Equation 1, the term 'Total_Interf' can represent the sum of $I_{MACRO}(c)$ (e.g., in units of dB over noise) plus $I_{SMALL}(c)$ (e.g., assumed to be 3 dB over noise) converted to units of dB such that Total_Interf can be added to delta '$\Delta$'. For example, in various embodiments, a function 'f(x)' can be defined to convert dB over noise to milliwatts (mW) such that 'f(x)=$10^{(x/10)}$*noise(mW)' such that 'Total_Interf=$10*LOG_{10}[f(I_{MACRO}(c))+f(3)]$'. In various embodiments, $\Delta$ may be set to a target SINR threshold value for cell edge UE or cell interior UE for small cell radio 'c'.

As noted, $I_{MACRO}(c)$ is the interference toward cell 'c' caused by one or more UE associated with a dominant macro cell radio (e.g., macro cell radio 116). In various embodiments, when there is no coordination between macro cell radios and small cell radios in a deployment, UE may be associated with a neighboring macro cell radio when it is measured to be even a few (e.g., 3 to 5) dB stronger than small cell UE, which means that the path loss to a small cell radio for macro cell UE can be about 20 dB less than the path loss to the corresponding macro cell radio. In various embodiments, the average IoT caused to a given small cell radio 'c' should be smaller than that caused by macro UE transmitting at all times since not all UE associated with a given macro cell radio will be close to the same small cell radio for a small cell deployment.

In various embodiments, $I_{MACRO}(c)$ for a given small cell radio 'c' can be calculated based on the total average interference measured at cell 'c' minus the total small cell UE interference caused by neighboring small cells. For example, in some embodiments, each small cell radio (e.g., small cell radios 114a-114b) can compute an average interference that UE served thereby can cause to one or more neighboring small cell radio(s). In various embodiments, an average interference caused toward a neighboring small cell radio(s) by UE served by given small cell radio 'c' can be based on determining a path loss to a given neighboring small cell radio in combination with the UE transmit power and number of resources assigned to each UE served by small cell radio 'c'. In various embodiments, path loss toward a given neighboring small cell radio for a particular UE (e.g., $PL_{UE}(c, u)$) can be calculated via measurement reports communicated to small cell radio 'c'.

Each small cell radio 114a-114b can report the average interference caused toward each of one or more neighboring cell(s) to central management system 122 via one or more messages generated by small cell radio 114a-114b. For example, small cell radio 114a can report the average interference caused toward neighboring small cell radio 114b and small cell radio 114b can report the average interference caused toward small cell radio 114a. Based on the reported interference caused to each neighboring small cell radio, central management system 122 can then calculate the interference caused toward each neighboring small cell radio in the small cell deployment based on the sum of interferences as reported by each of the small cell radios in the deployment for each corresponding neighboring small cell radio.

In some embodiments, central management system 122 can report to each small cell radio 114a-114b the total small cell UE interference caused toward each small cell radio by each of its neighboring small cell radio(s) present in the small cell radio deployment. In turn, each small cell radio can determine interference caused thereto from macro UEs by subtracting the total small cell UE interference caused thereto from the total average interference measured at the small cell radio. Thus, in various embodiments, $I_{MACRO}(c)$ can be determined based on the following equation such that $I_{MACRO}(c)$=total_avg_interf(c)−total_small_cell_interf(c), where total_avg_interf(c) is the total average interference as measured across time and frequency at small cell radio 'c', and total_small_cell_interf(c) is the total small cell interference caused toward small cell radio 'c' by one or more neighboring small cell radio(s).

In some embodiments, each small cell radio 114a-114b can report the average interference caused thereto from UE associated with macro cell radio 116 to central management system 122. In some embodiments, central management system 122 can use the report macro interference $I_{MACRO}(c)$ for each small cell radio to determine a small cell radio experiencing a highest interference from UE associated with macro cell radio 116 (e.g., if central management system 122 is configured to task the small cell radio experiencing the highest macro UE interference to calculate one or more set(s) candidate power control parameters.

In other embodiments, central management system 122 can calculate $I_{MACRO}(c)$ for each small cell radio 114a-114b based on the average interference caused to neighboring small cell radios that may be reported to central management system. In various embodiments, estimations of $I_{MACRO}(c)$ can be calculated in real-time or estimated off-line based on field experience, operator configuration, combinations thereof or the like.

In various embodiments, $\Delta$ can be set to a given Target_SINR$_{CELL\_EDGE}$ threshold value or a given Target_SINR$_{CELL\_INT}$ threshold value in order to create a system of equations for the first interference constraint such that a candidate set of $P_0$ and $\alpha$ can be calculated for the given small cell 'c'. The system of equations can be represented as follows according to Equation System 1 in which Target_SINR$_{CELL\_EDGE}$ and Target_SINR$_{CELL\_INT}$ is substituted for $\Delta$ for each equation in Equation System 1.

$$P_0 + (\alpha-1)\text{MAX}_{U\_CELL\_EDGE} PL_{UE}(c, u\_\text{cell\_edge}) \geq \text{Total\_Intel} + \text{Target\_SINR}_{CELL\_EDGE}$$

$$P_0 + (\alpha-1)\text{MAX}_{U\_CELL\_INT} PL_{UE}(c, u\_\text{cell\_int}) \geq \text{Total\_Interf} + \text{Target\_SINR}_{CELL\_INT}$$

Equation System 1:

In various embodiments, based on the system of equations shown in Equation System 1, one or more set(s) of candidate power control parameters (e.g., depending on configuration) can be determined for a given small cell radio 'c' (e.g., as determined by one or more small cell radio(s) 114a-114b or as determined by central management system 122). In some embodiments, if ICIC and/or sub-band scheduling are provided in communication system 100, the right-hand side of each equation can be replaced by the lowest interference expected for a given sub-band or several constraints can be used based on the lowest interference and the average interference for a given sub-band.

In some embodiments, adaptations of Equation 1 for cell edge UE can also be used to estimate the highest interference caused by UE in one small cell to another small cell, denoted herein as '$I_{HIGH}$'. For example, in some embodiments, an average $I_{HIGH}$ for a small cell deployment can be determined according using the equation: $P_0 + \alpha \text{MAX}_{c'} \text{MAX}_{u \in U(c')}[PL(c', u) - PL(c, u)]$ where the term c prime (c') represents all small cells radios other than small cell radio 'c'.

Turning to the second interference constraint, the second interference constraint may, in various embodiments, provide for limiting the maximum interference caused towards a given dominant macro cell radio (e.g., macro cell radio 116) by UE associated with one or more neighboring small cell radios (e.g., small cell radio 114a-114b) to constrain small cell UE transmit power levels. The second interference constraint can be represented as shown below in Equation 2.

$$\Sigma_c 1/|U(c)|[\Sigma_{u \in U(c)} dbmToLin(P_0(c) - PL_{macro}(c) + \alpha(c) PL_{UE}(c,u))] \leq IoT_{small \rightarrow macro}^{max}$$ Eq. 2

In general, Equation 2 can be used by central management system 122, via central power management module 150, to determine whether an average of a sum of expected interference that may be caused toward a given macro cell radio (e.g., macro cell radio 116) by small cell UE associated with one or more neighboring small cell radios (e.g., UE associated with small cell radios 114a-114b), for a given set of candidate power control parameters $P_0(c)$ and $\alpha(c)$ (e.g., as calculated by one or more small cell radio(s) 'c' or by central management system 122), exceeds a given threshold level of maximum interference that can be caused toward the macro cell radio, denoted herein as 'IoT$_{SMALL \rightarrow MACRO}^{MAX}$'. In various embodiments, the threshold level 'IoT$_{SMALL \rightarrow MACRO}^{MAX}$' that may be caused by neighboring small cell radio UE towards a given macro cell radio (e.g., macro cell radio 116) can be determined on the basis of the total IoT that would be caused toward a given macro cell radio without considering small cell UE interference. In various embodiments, 'IoT$_{SMALL \rightarrow MACRO}^{MAX}$' may be set such that IoT at the macro cell radio is at a given level, say, from 6 dB to 9 dB. For example, if the total IoT that would be caused toward a given macro cell radio is 6 dB, then the threshold level for 'IoT$_{SMALL \rightarrow MACRO}^{MAX}$' may be set to approximately 3 dB. In another example, if the existing IoT for a given macro cell radio (without small cell interference) is measured, the total IoT constraint can be used to determine the threshold level for 'IoT$_{SMALL \rightarrow MACRO}^{MAX}$'.

For Equation 2, the term 'dbmToLin' may represent a function that may convert decibel milliwatts (dBm) to milliwatts (mW). In various embodiments, certain assumptions can be made for Equation 2, which may aid in simplifying calculations for determining whether the second interference constraint may be met (e.g., whether an expected maximum interference that may be caused by small cell UE towards a given macro cell radio is below the threshold level) for a given set of candidate power control parameters. As discussed above, in some embodiments, one assumption may include assuming that the macro path loss, '$PL_{macro}(c)$', from a given macro cell radio to a given small cell radio 'c' may be approximately the same as the path loss from UE associated with the small cell radio to the macro cell radio. In some embodiments, another assumption can include that there exists one dominant macro cell radio in the vicinity of a cluster or group of neighboring small cell radios.

In some embodiments, another assumption for Equation 2 can include an assumption that $P_0(c) = P_0$ for all neighboring small cell radios in a group or cluster. In still other embodiments, a different assumption for Equation 2 can include an assumption that a given small cell radio 'c' may allow for a UE specific value of $P_0(c, u)$ for UE u associated with the small cell radio. In some embodiments, the term '$\alpha(c) PL_{UE}(c, u)$' can be determined based on deployment parameters, field data and/or real-time statistics averaged over a sufficient time period. In various embodiments, a sufficient time period might be an order of time scales at which UE distributions might change (e.g., in order of minutes). For example, UE distributions can change rapidly or slowly depending on a number of small cell deployment variations including, but not limited to, time of day, fixed or mobile deployments (e.g., stationary deployments such as buildings, etc. or mobile environments such as subways, trains, autos, etc.), deployment type (e.g., residential (single family and/or multi-family), commercial, etc.), combinations thereof or the like.

As discussed for the various embodiments provided herein, upon determining one or more set(s) of optimized power control parameters that meet the second interference constraint, central management system 122 can generate one or more messages toward each of small cell radio 114a-114b including the one or more set(s) of optimized power control parameters to set absolute uplink power levels for UE associated with the small cell radios. Upon receiving set(s) of optimized power control parameter(s), each small cell radio 114a-114b may set relative power levels for each corresponding UE served thereby (e.g., UE 112a-112b for small cell radio 114a, UE 112c for small cell radio 114b) according to various ICIC considerations to provide interference mitigation between the small cell radios.

In various embodiments, UE specific power control can be provided under an ICIC framework such that uplink UE transmit power may be set to the minimum of one of: 1) $P^{max}$, which may be a maximum capable transmit power for the UE; 2) a transmit power such that the interference PSD at a neighboring small cell radio is no higher than the average IoT on a given RB minus some target or expected cell edge UE SINR (e.g., target_SINR$_{CELL\_EDGE}$); or 3) an average UE PSD for a given small cell radio based on application of the second interference constraint to UE power levels set for the small cell radio, which can be RB specific. A given RB 'r' that a UE is scheduled to transmit on can affect its constraint on the maximum PSD in setting UE transmit power level; thus, in various embodiments, a local optimization of UE transmit power level can be adjusted according to RB scheduling for UE served by small cell radios 114a-114b within an ICIC framework.

For the various embodiments described herein, implementing small cell specific power control can be provided by setting 'Delta-MCS-enabled' (a common small cell radio configuration setting) for one or more of small cell radios 114a-114b to a FALSE setting. Setting 'Delta-MCS-enabled' to a FALSE setting implies that transmit PSD for UE served by a given small cell radio may remain constant irrespective of the MCS assigned thereto. Under this setting, an optimized value of $P_0$ and an optimized value of $\alpha$ may be determined using the two-constraint basis as described herein. In various embodiments, $P_0$ may be set such that a UE on the border of a coverage area transmits at a maximum power (e.g., small $\alpha$ implies a large $P_0$ and vice-versa) and $\alpha$ can be set based on a pair of considerations such that at a maximum value of $\alpha$ cell interior UEs (e.g., Signal-to-Noise Ratio (SNR) greater than 20-25 dB when transmitting at max power) should be received at an SINR of at least 15 dB and at a minimum value of $\alpha$ cell interior UEs and cell edge UEs may be received within about 15 dB (e.g., the exact value can depend on the de-sense properties of baseband for the UEs) of each other. In various embodiments, an advantage of using 'Delta-MCS-enabled' set to FALSE may be that with a same UE transmission power, MCS can be varied to maximize spectral efficiency.

Turning to FIGS. 2A-2C, FIGS. 2A-2C are simplified block diagrams illustrating example details of various elements that can be associated with communication system 100 in accordance with one or more embodiments. FIG. 2A is a simplified block diagram illustrating example details that can be associated with central management system 122 in accordance with one embodiment of communication system 100. FIG. 2B is a simplified block diagram illustrating example details that can be associated with small cell radio 114a in accordance with one embodiment of communication system 100. FIG. 2C is a simplified block diagram illustrating example details that can be associated with UE 112a in accordance with one embodiment of communication system 100.

Although FIG. 2B describes example features related to small cell radio 114a, it should be understood that the example features as described for small cell radio 114a can also be provided with respect to small cell radio 114b. Similarly, although FIG. 2C describes example features related to UE 112a, it should be understood that the example features as described for UE 112a can also be provided with respect to UE 112b-112d.

Referring to FIG. 2A, central management system 122 can include central power management module 150, a central management system storage 204, at least one processor 212 and at least one memory element 214. In at least one embodiment, at least one processor 212 is at least one hardware processor configured to execute various tasks, operations and/or functions of central management system 122 as described herein and at least one memory element 214 is configured to store data associated with central management system 122. In at least one embodiment, central power management module 150 is configured to implement various small cell uplink power control operations as described herein for central management system 122, including, but not limited to, determining one or more set(s) of candidate power control parameters $P_0$ and $\alpha$ according to Equation System 1 based on the first interference constraint as represented by Equation 1 (e.g., for the second operational architecture), determining one or more set(s) of optimized power control parameters that meet the second interference constraint (e.g., for the first or second operational architectures), determining a total sum of small cell UE interference for each small cell radio 114a-114b and/or other operations as described herein. In various embodiments, central management system storage 204 can be configured to store information associated with various small cell uplink power control operations as described herein including, but not limited to, storing one or more set(s) of candidate power control parameters (e.g., as reported to central management system 122 by one or more small cell radio 114a, 114b or as determined by central management system 122); storing an average interference of caused by each small cell radio toward neighboring small cell radio(s); and/or storing other small cell uplink power control information.

Referring to FIG. 2B, small cell radio 114a can include a transmitter 220, a receiver 222, one or more antenna(s) 224, an uplink power management module 226, a small cell radio storage 228, at least one processor 242 and at least one memory element 244. In at least one embodiment, at least one processor 242 is a hardware processor configured to execute various tasks, operations and/or functions of small cell radio 114a as described herein and at least one memory element 244 is configured to store data associated with small cell radio 114a. In at least one embodiment uplink power management module 226 is configured to implement various small cell uplink power control and/or resource management operations as described herein for small cell radio 114a, including, but not limited to, determining/calculating one or more set(s) of candidate power control parameters $P_0$ and $\alpha$ according to Equation System 1 based on the first interference constraint as represented by Equation 1 (e.g., for the first operational architecture), determining estimate UE and macro path loss information (e.g., for the second operational architecture) and/or setting relative UE power levels according to absolute power levels that may be based on optimized power control parameters received from central management system 122.

In various embodiments, small cell radio storage 228 can be configured to store information associated with various small cell uplink power control and/or resource management operations as described herein including, but not limited to, total small cell UE interference, which can be received from central management system 122; one or more set(s) of candidate power control parameters, estimated path loss information and/or other small cell uplink power control information. In various embodiments, transmitter 220 and receiver 222 can be connected to one or more antenna(s) 224 to facilitate the transmission and/or reception of cellular data and/or information to/from one or more UE (e.g., UE 112a-112b) served by small cell radio 114a using one or more over-the-air control channels, data channels, combinations thereof or the like.

Referring to FIG. 2C, UE 112a can include a transmitter 250, a receiver 252, one or more antenna(s) 254, a user equipment storage 256, at least one processor 262 and at least one memory element 264. In at least one embodiment, at least one processor 262 is at least one hardware processor configured to execute various tasks, operations and/or functions of UE 112a as described herein and at least one memory element 264 is configured to store data associated with UE 112a. In various embodiments, user equipment storage 256 can be configured to store information associated with UE 112a for the operation of UE 112a. In various embodiments, transmitter 250 and receiver 252 can be connected to one or more antenna(s) 254 to facilitate the transmission and/or reception of cellular data and/or information to/from one or more cell radios (e.g., small cell radio 114*a*) using one or more over-the-air control channels, data channels, combinations thereof or the like.

In regards to the internal structure associated with communication system 100, each of UE 112*b*-112*d*, small cell radio 114*b* and macro cell radio 116 may each also include a respective processo, a respective memory element and/or respective storage. Small cell radio 114*b* can additionally include one or more transmitters, receivers and/or antennas to facilitate over-the-air communications, a respective power management module and respective storage. Hence, appropriate software, hardware and/or algorithms are being provisioned in UE 112*a*-112*d*, small cell radio 114*a*-114*b*, macro cell radio 116 and central management system 122 in order to facilitate small cell uplink power control and/or resource management operations as described for various embodiments discussed herein. Note that in certain examples, certain databases (e.g., for storing information associated with uplink power control and/or resource management for communication system 100) can be consolidated with memory elements (or vice versa), or the storage can overlap/exist in any other suitable manner.

In one example implementation, UE 112*a*-112*d*, small cell radio 114*a*-114*b*, macro cell radio 116 and central management system 122 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate small cell uplink power control and/or resource management operations (e.g., for networks such as those illustrated in FIG. 1A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 112*a*-112*d*, small cell radio 114*a*-114*b*, macro cell radio 116 and central management system 122 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 112*a*-112*d*, small cell radio 114*a*-114*b*, macro cell radio 116 and central management system 122 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the small cell uplink power control and/or resource management functions as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 2A-2C] can store data used for the operations described herein. This includes the memory elements being able to store software, logic, code, or processor instructions that are executed to carry out the activities described herein. A processor (e.g., a hardware processor) can execute any type of instructions associated with the data to achieve the operations detailed herein. In one example, the processors [as shown in FIGS. 2A-2C] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Turning to FIG. 3, FIG. 3 is a simplified flow diagram illustrating example operations 300 associated with providing small cell uplink power control in a network environment in accordance with one potential embodiment of communication system 100. In particular, operations 300 can be associated with the first operational architecture in which one or more small cell radios of a plurality of small cell radios (e.g., small cell radios 114*a*-114*b*) may determine one or more set(s) of candidate power control parameters using the first interference constraint. In various embodiments, the operations can be performed via one or more of small cell radios 114*a*-114*b* and a central management entity (e.g., central management system 122).

At any time, uplink transmissions can be scheduled for user equipment connected among one or more neighboring small cell radios (e.g., UE 112*a*-112*b* associated with small cell radio 114*a*, UE 112*c* associated with small cell radio 112*b*) for a small cell deployment of communication system 100. Accordingly, the operations can begin at 302 in which one or more small cell radio(s) (e.g., small cell radio 114*a*, 114*b*) may calculate one or more set(s) of power control parameters (e.g., $P_0$ and $\alpha$) using a first interference constraint for uplink UE transmissions for UE served by the one or more small cell radio(s). In various embodiments, the first interference constraint can be associated with a system of equations (e.g., Equation System 1 based on Equation 1) associated, at least in part, with interference generated towards each of the small cell radio(s) by one or more UE associated with at least one macro cell radio (e.g., UE 112*d* associated with macro cell radio 116) in a vicinity (e.g., having an overlapping coverage area) of the small cell radio(s).

In some embodiments, depending on configuration (e.g., operator, service provider, etc. configuration), a central management entity (e.g., central management system 122) can be configured to task each of the plurality of small cell radios in a small cell deployment to calculate one or more set(s) of candidate power control parameters according to the first interference constraint. In other embodiments, depending on configuration, the central management entity can be configured to task a particular small cell radio that may be determined to experience the highest interference from UEs associated with a dominant macro cell radio to calculate one or more set(s) of candidate set(s) of power control parameters according to the first interference constraint.

At 304, the operations can include receiving, at a central management entity (e.g., central management system 122), the one or more set(s) of candidate of power control parameters generated by the one or more small cell radio(s). At 306, the operations can include determining, at the central management entity, whether an average of a sum of an expected interference for UE associated with the plurality of small cell radios violates a second interference constraint for any of the one or more set(s) of candidate power control parameters. In various embodiments, the second interference constraint can be associated with interference that may be generated by small cell UE associated with the plurality of small cell radios towards the at least one macro cell radio (e.g., as represented by Equation 2). In various embodiments, the determining performed by the central management entity can include determining whether the average of the sum expected interference that may be caused by the UE according to a given set of candidate power control parameters for each of the plurality of small cell radios exceeds a maximum allowable interference that can be caused towards the at least one macro cell.

At 308, the operations can include generating a message for each of the plurality of small cell radios identifying one or more set(s) of particular (e.g., optimized) power control parameters that provide for satisfying the second interference constraint and the operations may end. In some embodiments, the operations can include, at 310, each small cell radio setting relative uplink power levels for small cell UE associated thereto according to an ICIC framework that seeks to reduce interference between neighboring small cell radios. Accordingly, as shown in operations 300, communication system 100 may provide for a method to facilitate small cell uplink power control in a network environment in accordance with one embodiment of the present disclosure.

Figure 4:
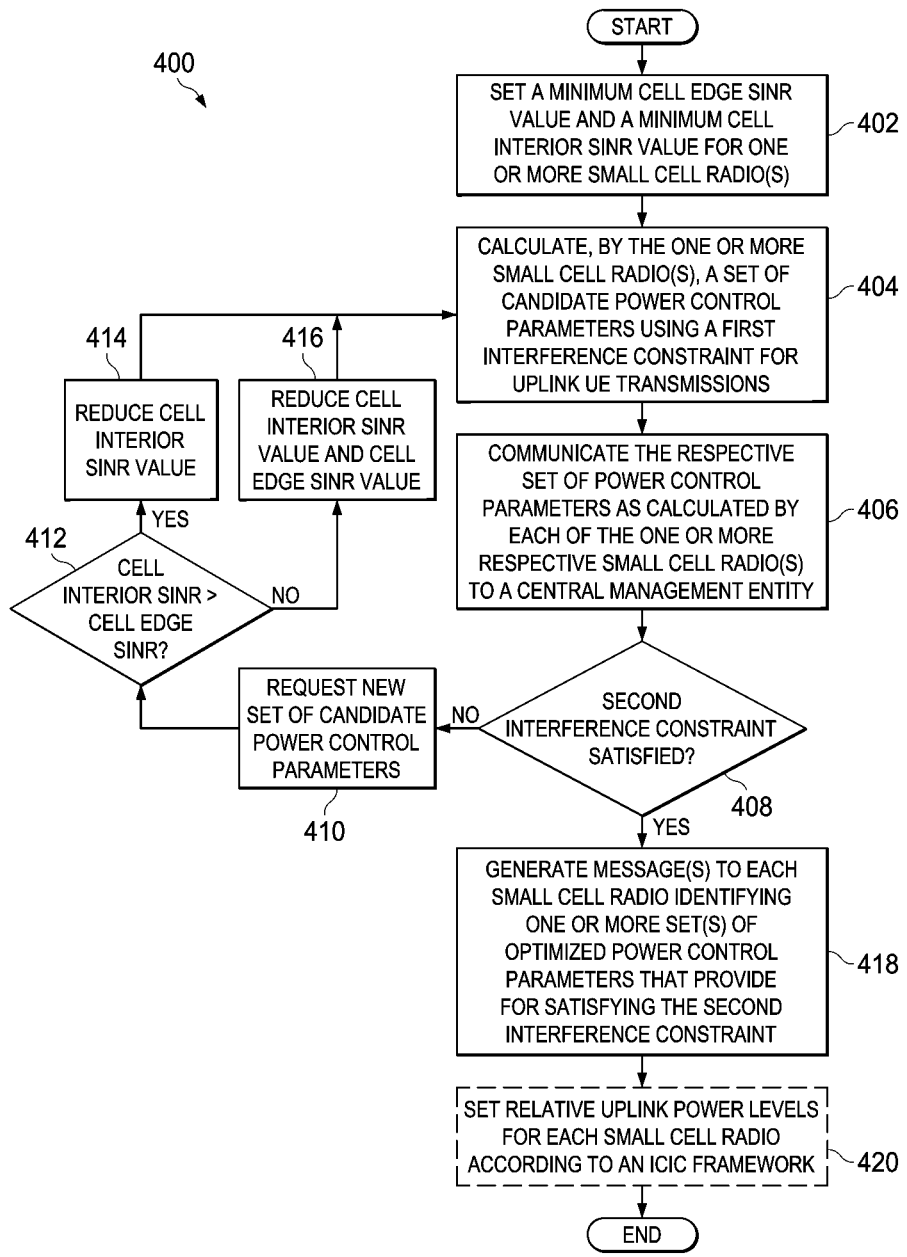
FIG. 4 is a simplified flow diagram illustrating other example operations associated with providing small cell uplink power control in a network environment in accordance with one potential embodiment of the communication system.

Turning to FIG. 4, FIG. 4 is a simplified flow diagram illustrating other example operations 400 associated with providing small cell uplink power control in a network environment in accordance with one potential embodiment of communication system 100. In particular, example operations 400 may be associated with a variation of the first operational architecture in which one or more small cell radio(s) and a central management entity (e.g., central management system 122) may operate through iterative exchanges to determine a set of optimized power control parameters that meet the first and second interference constraints. In various embodiments, the operations can be performed via one or more of a plurality of small cell radios (e.g., cell radios small 114a-114b) and a central management entity (e.g., central management system 122).

At any time, uplink transmissions can be scheduled for user equipment connected among one or more neighboring small cell radios (e.g., UE 112a-112b associated with small cell radio 114a, UE 112c associated with small cell radio 112b) of communication system 100. Accordingly, the operations can begin at 402 in which one or more small cell radio(s) (e.g., small cell radio(s) 114a, 114b) may set a minimum cell edge SINR threshold value for cell edge UE uplink transmissions (e.g., 5 dB) and a minimum cell interior SINR threshold value for cell interior UE uplink transmissions (e.g., 15 dB). In some embodiments, central management system 122 may communicate a minimum cell edge UE SINR threshold value and a minimum cell interior SINR threshold value for one or more small cell radio(s).

At 404, the operations can include the one or more small cell radio(s) calculating a set of candidate power control parameters (e.g., $P_0$ and $\alpha$) using a first interference constraint for uplink UE transmissions for UE served by the one or more small cell radio(s). In various embodiments, the first interference constraint can be associated with a system of equations based on Equation 1 in which the minimum cell edge SINR threshold value and the minimum cell interior SINR threshold value can be used to determine the set of candidate power control parameters. At 406, the operations can include communicating the respective set of candidate power control parameters as calculated by each of the one or more respective small cell radio(s) to a central management entity (e.g., central management system 122).

In some embodiments, depending on configuration (e.g., operator, service provider, etc. configuration), the central management entity can be configured to task each small cell radio 144a and 144b to perform operations 402, 404 and 406. In other embodiments, depending on configuration, the central management entity can be configured to determine a particular small cell radio that is experiencing the highest interference from macro cell UE and may select that particular small cell radio to perform operations 402, 404 and 406. In various embodiments, a determination of which of one or more small cell radios may be experiencing a highest macro cell UE interference can be performed by the central management entity using values of $I_{MACRO}(c)$ for each small cell radio, which can be calculated by the central management entity or can calculated by each small cell radio and reported to the central management entity.

At 408, the central management entity determines whether an average of a sum of an expected interference for small cell UE associated with the plurality of small cell radios violates a second interference constraint associated with a maximum interference that may be caused by small cell UE associated with the small cell radios towards at least one macro cell radio (e.g., a dominant macro cell radio such as, for example, macro cell radio 116) for respective sets of candidate power control parameters received from the one or more respective small cell radios.

If at 408, the central management entity determines that the second interference constraint is not satisfied, the operations can continue to 410 in which the central management entity can request the one or more small cell radio(s) to calculate a new set of candidate power control parameters. At 412, each of the one or more small cell radio(s) may determine whether the current cell interior SINR value is greater than the current cell edge SINR value. If a given cell radio determines that the current cell interior SINR value is greater than the current SINR value used for its first interference constraint calculations, operations for the given small cell radio can continue to 414 in which the cell interior SINR value can be reduced by a predetermined amount and the operations can return to 404 for the given small cell radio in which a new set of candidate power control parameters can be calculated according to the first interference constraint using the reduced cell interior SINR value. In various embodiments, the predetermined amount can be a predetermined step size, which can be varied in size from approximately 0.5 dB to approximately 1 dB.

However, If a given cell radio determines that its current cell interior SINR value is not greater than the current SINR value used for its first interference constraint calculations (e.g., if they are equal to each other), operations for the given small cell radio can continue to 416 in which both the cell interior SINR value and the cell edge SINR value can be reduced by a predetermined amount and the operations can return to 404 for the given small cell radio in which a new set of candidate power control parameters can be calculated according the first interference constraint using the reduced cell interior SINR value and the reduced cell edge SINR value.

The operations at 404, 406, 408, 410, 412 and 414 or 416 can continue until the central management entity determines that the second interference constraint is satisfied (e.g., the maximum expected interference to be caused towards macro cell radio 116 is below a maximum interference threshold) in which case the operations can continue to 418. At 418, the central management entity may generate one or more message(s) to each small cell radio identifying one or more set(s) of optimized power control parameters that provide for satisfying the second interference constraint and the operations may end. In some embodiments, each small cell radio 114a-114b may receive the same set(s) of optimized power control parameters (e.g., if one small cell radio is tasked with calculating set(s) of candidate power control parameters for a group or cluster of small cell radios). In other embodiments, each small cell radio 114a-114b may receive cell-specific set(s) of optimized power control parameters (e.g., if each small cell radio in a group or cluster is tasked with calculating set(s) of candidate power control parameters). In some embodiments, the operations can include, at 420, each small cell radio setting relative uplink power levels for small cell UE associated thereto according to an ICIC framework that seeks to reduce interference between neighboring small cell radios.

Turning to FIG. 5, FIG. 5 is a simplified flow diagram illustrating yet other example operations 500 associated with providing small cell uplink power control in a network environment in accordance with one potential embodiment of communication system 100. In particular, example operations 500 may be associated with another variation of the first operational architecture in which one or more small cell radio(s) may calculate multiple sets of candidate power control parameters that meet to first interference constraint to feed to a central management entity (e.g., central management system 122), which may search the sets to determine one or more set(s) of optimized power control parameters that meet second interference constraint. In various embodiments, the operations can be performed via one or more of a plurality of small cell radios (e.g., cell radios small 114a-114b) and a central management entity (e.g., central management system 122).

At any time, uplink transmissions can be scheduled for user equipment connected among one or more neighboring small cell radios (e.g., UE 112a-112b associated with small cell radio 114a, UE 112c associated with small cell radio 112b) of communication system 100. Accordingly, the operations can begin at 502 in which one or more small cell radio(s) (e.g., small cell radio(s) 114a, 114b) may calculate multiple sets of candidate power control parameters using a first interference constraint for uplink UE transmissions for small cell UE served by the one or more small cell radio(s). In various embodiments, the first interference constraint can be associated with a system of equations based on Equation 1 in which a first range of cell edge SINR threshold values and a second range of cell interior SINR threshold values can be used to determine the multiple sets of candidate power control parameters.

At 504, the operations can include communicating the respective sets of candidate power control parameters as calculated by the one or more respective small cell radio(s) to a central management entity (e.g., central management system 122). In some embodiments, depending on configuration (e.g., operator, service provider, etc. configuration), the central management entity can be configured to task each small cell radio 144a and 144b to perform operations 502 and 504. In other embodiments, depending configuration, the central management entity can be configured to determine a particular small cell radio that is experiencing the highest interference from macro cell UE and may select that particular small cell radio to perform operations 502 and 504. In various embodiments, a determination of which of one or more small cell radios may be experiencing a highest macro cell UE interference can be performed by the central management entity using values of $I_{MACRO}(c)$ for each small cell radio, which can be calculated by the central management entity or can calculated by each small cell radio and reported to the central management entity.

At 506, the central management entity can search the respective sets of candidate power control parameters to determine one or more set(s) of optimized power control parameters that meet a second interference constraint associated with a maximum interference that may be caused by small cell UE associated with the small cell radios towards at least one macro cell radio (e.g., a dominant macro cell radio such as, for example, macro cell radio 116). At 508, the central management entity may generate one or more message(s) to each small cell radio identifying one or more set(s) of optimized power control parameters that provide for meeting the second interference constraint and the operations may end. In some embodiments, each small cell radio 114a-114b may receive the same set(s) of optimized power control parameters (e.g., if one small cell radio is tasked with calculating set(s) of candidate power control parameters for a group or cluster of small cell radios). In other embodiments, each small cell radio 114a-114b may receive cell-specific set(s) of optimized power control parameters (e.g., if each small cell radio in a group or cluster is tasked with calculating set(s) of candidate power control parameters).

In some embodiments, the operations can include, at 510, each small cell radio setting relative uplink power levels for small cell UE associated thereto according to an ICIC framework that seeks to reduce interference between neighboring small cell radios. In various embodiments, operations 500 as shown in FIG. 5 may provide for reduced signaling between central management system 122 and one or more small cell radio(s) 114a, 114b as compared to operations 400 as shown in FIG. 4 in order to facilitate providing small cell uplink power control for communication system 100.

Turning to FIG. 6, FIG. 6 is a simplified flow diagram illustrating example operations 600 associated with providing small cell uplink power control in a network environment in accordance with one potential embodiment of communication system 100. In particular, operations 600 can be associated with the second operational architecture in which a central management entity (e.g., central management system 122) can determine one or more set(s) of optimized power control parameters based on estimated path loss information received from one or more small cell radios of a plurality of small cell radios (e.g., small cell radios 114a-114b). In various embodiments, the operations can be performed via one or more of small cell radios 114a-114b and a central management entity (e.g., central management system 122).

At any time, uplink transmissions can be scheduled for user equipment connected among one or more neighboring small cell radios (e.g., UE 112a-112b associated with small cell radio 114a, UE 112c associated with small cell radio 112b) for a small cell deployment of communication system 100. Accordingly, the operations can begin at 602 in which UE path loss information associated with one or more UE served by one or more small cell radio(s) 114a, 114b can be determined. At 604, macro path loss information associated with each of the one or more small cell radio(s) 114a, 114b and a dominant macro cell radio (e.g., macro cell radio 116) can be determined.

At 606, the operations can include determining, at a central management entity (e.g., central management system 122, via central power management module 150), one or more set(s) of optimized power control parameters for uplink UE transmissions for the one or more UE served by the one or more small cell radios. In various embodiments, the one or more set(s) of optimized power control parameters may satisfy the first interference constraint associated with limiting interference between the one or more small cell radios for UE transmissions that may overcome interference caused by one or more macro UE served by the dominant macro cell radio and the one or more set(s) of optimized power control parameters may satisfy the second interference constraint associated with limiting interference toward the dominant macro cell radio.

At 608, the central management entity may generate one or more message(s) to each small cell radio identifying one or more set(s) of optimized power control parameters that provide for meeting the second interference constraint and the operations may end. In some embodiments, each small cell radio 114a-114b may receive the same set(s) of optimized power control parameters (e.g., if one small cell radio is tasked with calculating set(s) of candidate power control parameters for a group or cluster of small cell radios). In other embodiments, each small cell radio 114a-114b may receive cell-specific set(s) of optimized power control parameters (e.g., if each small cell radio in a group or cluster is tasked with calculating set(s) of candidate power control parameters).

In some embodiments, the operations can include, at 610, each small cell radio setting relative uplink power levels for small cell UE associated thereto according to an ICIC framework that seeks to reduce interference between neighboring small cell radios.

Turning to FIG. 7, FIG. 7 is a simplified flow diagram illustrating example operations 700 associated with providing small cell uplink power control in a network environment in accordance with one potential embodiment of communication system 100. In particular, operations 700 can be associated with the second operational architecture in which a central management entity (e.g., central management system 122) can determine one or more set(s) of optimized power control parameters based on estimated path loss information received from one or more small cell radios of a plurality of small cell radios (e.g., small cell radios 114a-114b). In various embodiments, the operations can be performed via one or more of small cell radios 114a-114b and a central management entity (e.g., central management system 122).

At 702, the operations can include receiving, at a central management entity, UE path loss information associated with one or more UE served by one or more small cell radio(s) 114a-114b and macro path loss information associated with each of the one or more small cell radio(s) and a dominant macro cell radio. At 704, the central management entity can calculate one or more set(s) of candidate power control parameters for a first interference constraint associated with limiting interference between the one or more small cell radios for UE transmissions that may overcome interference caused by one or more macro UE served by the dominant macro cell radio.

At 706, the central management entity can determine whether an average of a sum of an expected interference for the one or more UE served by the one or more small cell radio(s) satisfies a second interference constraint for any of the one or more set(s) of candidate power control parameters. In various embodiments, the second interference constraint can be associated with interference that may be generated by small cell UE towards the at least one macro cell radio (e.g., as represented by Equation 2). In various embodiments, the determining performed by the central management entity can include determining whether the average of the sum expected interference that may be caused by the UE according to a given set of candidate power control parameters for each of the plurality of small cell radios exceeds a maximum allowable interference that can be caused towards the at least one macro cell radio.

At 708, the central management entity can identify one or more set(s) of optimized power control parameters, which correspond to any of the one or more set(s) of candidate power control parameters that satisfy the second interference constraint. At 710, the central management entity may generate one or more message(s) to each small cell radio identifying one or more set(s) of optimized power control parameters that provide for meeting the second interference constraint and the operations may end. In some embodiments, each small cell radio 114a-114b may receive the same set(s) of optimized power control parameters (e.g., if one small cell radio is tasked with calculating set(s) of candidate power control parameters for a group or cluster of small cell radios). In other embodiments, each small cell radio 114a-114b may receive cell-specific set(s) of optimized power control parameters (e.g., if each small cell radio in a group or cluster is tasked with calculating set(s) of candidate power control parameters).

In some embodiments, the operations can include, at 712, each small cell radio setting relative uplink power levels for small cell UE associated thereto according to an ICIC framework that seeks to reduce interference between neighboring small cell radios.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    calculating, by one or more of a plurality of small cell radios, one or more sets of candidate power control parameters using a first interference constraint for uplink user equipment (UE) transmissions for UE served by the one or more of the plurality of small cell radios;
    receiving, at a central management entity, the one or more sets of candidate power control parameters from each of the one or more of the plurality of small cell radios;
    determining, at the central management entity, whether an average of a sum of an expected interference for UE associated with the plurality of small cell radios violates a second interference constraint for any of the one or more sets of candidate power control parameters;
    generating one or more messages for each of the plurality of small cell radios identifying one or more particular sets of power control parameters that provide for meeting the second interference constraint; and
    setting, by each small cell radio of the plurality of small cell radios, uplink transmit power for each UE served by each small cell radio based, at least in part, on the identified one or more particular sets of power control parameters.

2. The method of claim 1, wherein each set of power control parameters includes:
    a first power control parameter associated with a power offset for UE transmissions toward a particular small cell radio; and
    a second power control parameter associated with an amount of path loss between UE and the particular small cell radio that is inverted for UE transmissions toward the particular small cell radio.

3. The method of claim 1, wherein the first interference constraint is associated, at least in part, with interference generated towards each of the one or more of the plurality of small cell radios by one or more UE associated with at least one macro cell radio.

4. The method of claim 1, wherein the second interference constraint is associated, at least in part, with interference generated by the UE associated with the plurality of small cell radios towards at least one macro cell radio.

5. The method of claim 1, wherein for a particular small cell radio calculating a particular set of candidate power control parameters further comprises:
    setting a first expected Signal to Interference plus Noise Ratio (SINR) threshold value associated with cell edge UE served by the particular small cell radio for the first interference constraint;
    setting a second expected SINR threshold value associated with cell interior UE served by the particular small cell radio for the first interference constraint;
    calculating the particular set of candidate power control parameters for the particular small cell radio using the first expected SINR threshold value and the second expected SINR threshold value for the first interference constraint; and
    generating a message toward the central management entity including the particular set of candidate power control parameters.

6. The method of claim 5, further comprising:
    reducing at least one of the second expected SINR threshold value associated with cell interior UE or the first expected SINR threshold value associated with cell edge UE if the central management entity determines that the second interference constraint is violated; and
    repeating the calculating and the generating for the particular small cell radio until the central management entity determines that the second interference constraint is satisfied.

7. The method of claim 1, wherein for a particular small cell radio calculating sets of candidate power control parameters further comprises:
    setting a first range of first expected Signal to Interference plus Noise Ratio (SINR) threshold values associated with cell edge UE served by the particular small cell radio for the first interference constraint;
    setting a second range of second expected SINR threshold values associated with cell interior UE served by the particular small cell radio for the first interference constraint;

calculating sets of candidate power control parameters for the particular small cell radio using each of the first expected SINR threshold value of the first range and each of the second expected SINR threshold value of the second range for the first interference constraint; and generating one or more messages toward the central management entity including the sets of candidate power control parameters.

8. The method of claim 1, wherein the central management entity is a Self-Organizing Network (SON) management system in communication with each of the plurality of small cell radios.

9. One or more non-transitory tangible media encoding logic that includes instructions for execution that when executed by a processor, is operable to perform operations comprising:

calculating, by one or more of a plurality of small cell radios, one or more sets of candidate power control parameters using a first interference constraint for uplink user equipment (UE) transmissions for UE served by the one or more of the plurality of small cell radios;

receiving, at a central management entity, the one or more sets of candidate power control parameters from each of the one or more of the plurality of small cell radios;

determining, at the central management entity, whether an average of a sum of an expected interference for UE associated with the plurality of small cell radios violates a second interference constraint for any of the one or more sets of candidate power control parameters;

generating one or more messages for each of the plurality of small cell radios identifying one or more particular sets of power control parameters that provide for meeting the second interference constraint; and setting, by each small cell radio of the plurality of small cell radios, uplink transmit power for each UE served by each small cell radio based, at least in part, on the identified one or more particular sets of power control parameters.

10. The media of claim 9, wherein each set of power control parameters includes:

a first power control parameter associated with a power offset for UE transmissions toward a particular small cell radio; and a second power control parameter associated with an amount of path loss between UE and the particular small cell radio that is inverted for UE transmissions toward the particular small cell radio.

11. The media of claim 9, wherein the first interference constraint is associated, at least in part, with interference generated towards each of the one or more of the plurality of small cell radios by one or more UE associated with at least one macro cell radio.

12. The media of claim 9, wherein the second interference constraint is associated, at least in part, with interference generated by the UE associated with the plurality of small cell radios towards at least one macro cell radio.

13. The media of claim 9, wherein for a particular small cell radio calculating a particular set of candidate power control parameters further comprises:

setting a first expected Signal to Interference plus Noise Ratio (SINR) threshold value associated with cell edge UE served by the particular small cell radio for the first interference constraint;

setting a second expected SINR threshold value associated with cell interior UE served by the particular small cell radio for the first interference constraint;

calculating the particular set of candidate power control parameters for the particular small cell radio using the first expected SINR threshold value and the second expected SINR threshold value for the first interference constraint; and generating a message toward the central management entity including the particular set of candidate power control parameters.

14. The media of claim 13, the operations further comprising:

reducing at least one of the second expected SINR threshold value associated with cell interior UE or the first expected SINR threshold value associated with cell edge UE if the central management entity determines that the second interference constraint is violated; and repeating the calculating and the generating for the particular small cell radio until the central management entity determines that the second interference constraint is satisfied.

15. The media of claim 9, wherein for a particular small cell radio calculating sets of candidate power control parameters further comprises:

setting a first range of first expected Signal to Interference plus Noise Ratio (SINR) threshold values associated with cell edge UE served by the particular small cell radio for the first interference constraint;

setting a second range of second expected SINR threshold values associated with cell interior UE served by the particular small cell radio for the first interference constraint;

calculating sets of candidate power control parameters for the particular small cell radio using each of the first expected SINR threshold value of the first range and each of the second expected SINR threshold value of the second range for the first interference constraint; and generating one or more messages toward the central management entity including the sets of candidate power control parameters.

16. A system, comprising:

at least one memory element for storing data; and at least one processor that executes instructions associated with the data, wherein the at least one processor and the at least one memory element cooperate such that the system is configured for:

calculating, by one or more of a plurality of small cell radios, one or more sets of candidate power control parameters using a first interference constraint for uplink user equipment (UE) transmissions for UE served by the one or more of the plurality of small cell radios;

receiving, at a central management entity, the one or more sets of candidate power control parameters from each of the one or more of the plurality of small cell radios;

determining, at the central management entity, whether an average of a sum of an expected interference for UE associated with the plurality of small cell radios violates a second interference constraint for any of the one or more sets of candidate power control parameters;

generating one or more messages for each of the plurality of small cell radios identifying one or more particular sets of power control parameters that provide for meeting the second interference constraint; and setting, by each small cell radio of the plurality of small cell radios, uplink transmit power for each UE served by each small cell radio based, at least in part, on the identified one or more particular sets of power control parameters.

17. The system of claim 16, wherein the first interference constraint is associated, at least in part, with interference generated towards each of the one or more of the plurality of small cell radios by one or more UE associated with at least one macro cell radio and wherein the second interference constraint is associated, at least in part, with interference generated by the UE associated with the plurality of small cell radios towards the at least one macro cell radio.

18. The system of claim 16, wherein for a particular small cell radio calculating a particular set of candidate power control parameters further comprises:
setting a first expected Signal to Interference plus Noise Ratio (SINR) threshold value associated with cell edge UE served by the particular small cell radio for the first interference constraint;
setting a second expected SINR threshold value associated with cell interior UE served by the particular small cell radio for the first interference constraint;
calculating the particular set of candidate power control parameters for the particular small cell radio using the first expected SINR threshold value and the second expected SINR threshold value for the first interference constraint; and
generating a message toward the central management entity including the particular set of candidate power control parameters.

19. The system of claim 18, wherein the system is further configured for:
reducing at least one of the second expected SINR threshold value associated with cell interior UE or the first expected SINR threshold value associated with cell edge UE if the central management entity determines that the second interference constraint is violated; and
repeating the calculating and the generating for the particular small cell radio until the central management entity determines that the second interference constraint is satisfied.

20. The system of claim 16, wherein for a particular small cell radio calculating sets of candidate power control parameters further comprises:
setting a first range of first expected Signal to Interference plus Noise Ratio (SINR) threshold values associated with cell edge UE served by the particular small cell radio for the first interference constraint;
setting a second range of second expected SINR threshold values associated with cell interior UE served by the particular small cell radio for the first interference constraint;
calculating sets of candidate power control parameters for the particular small cell radio using each of the first expected SINR threshold value of the first range and each of the second expected SINR threshold value of the second range for the first interference constraint; and
generating one or more messages toward the central management entity including the sets of candidate power control parameters.

* * * * *